United States Patent
Shiraishi

(10) Patent No.: US 10,275,333 B2
(45) Date of Patent: Apr. 30, 2019

(54) RISK ANALYSIS OF CODEBASE USING STATIC ANALYSIS AND PERFORMANCE DATA

(71) Applicant: TOYOTA JIDOSHA KABUSHIKI KAISHA, Toyota-shi, Aichi-ken (JP)

(72) Inventor: Shinichi Shiraishi, San Jose, CA (US)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/306,153

(22) Filed: Jun. 16, 2014

(65) Prior Publication Data
US 2015/0363292 A1 Dec. 17, 2015

(51) Int. Cl.
G06F 9/44 (2018.01)
G06F 9/45 (2006.01)
G06F 11/36 (2006.01)
G06F 11/00 (2006.01)
G06F 11/34 (2006.01)

(52) U.S. Cl.
CPC ........ *G06F 11/3604* (2013.01); *G06F 11/008* (2013.01); *G06F 11/34* (2013.01); *G06F 11/366* (2013.01); *G06F 11/3664* (2013.01)

(58) Field of Classification Search
CPC .......... G06F 8/70; G06F 8/20; G06F 11/3604–11/3664; G06F 11/3668; G06F 11/008; G06F 11/34; G06F 11/366
See application file for complete search history.

(56) References Cited

U.S. PATENT DOCUMENTS

| | | | | |
|---|---|---|---|---|
| 6,477,471 B1 * | 11/2002 | Hedstrom | ........... | G06F 11/3616 702/34 |
| 7,181,713 B2 * | 2/2007 | Schultz | ............... | G06F 17/5031 716/108 |
| 7,340,726 B1 * | 3/2008 | Chelf | ........................ | G06F 8/71 714/38.12 |
| 8,116,934 B2 * | 2/2012 | Ishikawa | ................ | G07C 5/008 701/31.8 |
| 8,296,741 B1 * | 10/2012 | Huang | ................ | G06F 11/3604 717/135 |

(Continued)

FOREIGN PATENT DOCUMENTS

| JP | 2008-107982 A | 5/2008 |
|---|---|---|
| JP | 2009-169573 A | 7/2009 |

OTHER PUBLICATIONS

Vinicius Rafael Lobo de Mendonca, Static Analysis Techniques and Tools: A Systematic Mapping Study, 2013, pp. 1-7.*

(Continued)

*Primary Examiner* — Mongbao Nguyen
(74) *Attorney, Agent, or Firm* — Patent Law Works LLP

(57) ABSTRACT

An example system is configured to calculate performance statistics for a set of analysis tools; analyze a codebase using one or more analysis tools from the set of analysis tools; generate an analysis result for each analysis tool of the one or more analysis tools, the result describing one or more faults and one or more validations identified by the corresponding analysis tool; and estimate a risk of defects in the codebase based on the analysis result associated with each of the one or more analysis tools and the performance statistics associated with each of the one or more analysis tools.

27 Claims, 16 Drawing Sheets

(56) References Cited

U.S. PATENT DOCUMENTS

| | | | | |
|---|---|---|---|---|
| 8,327,334 | B2* | 12/2012 | Chockler | G06F 11/3676 717/124 |
| 8,356,282 | B1* | 1/2013 | Leippe | G06F 11/3664 717/125 |
| 8,473,907 | B1* | 6/2013 | Zandi | G06F 11/3616 714/38.1 |
| 8,621,441 | B2* | 12/2013 | Landwehr | G06F 11/3604 714/38.1 |
| 8,997,055 | B2* | 3/2015 | van Gogh | G06F 11/3604 714/38.1 |
| 9,038,030 | B2* | 5/2015 | Rama | G06F 11/008 717/124 |
| 9,152,485 | B2* | 10/2015 | Bird | G06F 11/008 |
| 9,235,493 | B2* | 1/2016 | Goetsch | G06F 11/3604 |
| 9,400,887 | B2* | 7/2016 | Maeda | G06F 11/3604 |
| 9,542,176 | B2* | 1/2017 | Bird | G06F 11/008 |
| 9,612,831 | B2* | 4/2017 | Mendis | G06F 8/77 |
| 2003/0005364 | A1* | 1/2003 | Chung et al. | 714/38 |
| 2003/0110474 | A1 | 6/2003 | Ur et al. | |
| 2005/0229044 | A1 | 10/2005 | Ball | |
| 2006/0184829 | A1* | 8/2006 | Cheong | G06F 11/3604 714/39 |
| 2006/0248519 | A1* | 11/2006 | Jaeger | G06F 8/51 717/141 |
| 2007/0006194 | A1 | 1/2007 | Mejri et al. | |
| 2007/0089092 | A1 | 4/2007 | Schmidt et al. | |
| 2007/0234305 | A1* | 10/2007 | Mishra | G06F 8/43 717/128 |
| 2008/0244539 | A1* | 10/2008 | Rajamani, Sr. | G06F 8/45 717/140 |
| 2009/0182758 | A1* | 7/2009 | Lotlikar | G06F 17/3053 |
| 2009/0259989 | A1 | 10/2009 | Cifuentes et al. | |
| 2009/0313605 | A1* | 12/2009 | Ostrand | G06F 11/008 717/124 |
| 2010/0251221 | A1* | 9/2010 | Nori | G06F 11/3608 717/131 |
| 2010/0333069 | A1* | 12/2010 | Chandra et al. | 717/126 |
| 2011/0055798 | A1* | 3/2011 | Kraft | G06F 8/77 717/100 |
| 2011/0067005 | A1* | 3/2011 | Bassin | G06F 11/008 717/127 |
| 2011/0067006 | A1* | 3/2011 | Baker | G06F 9/44589 717/127 |
| 2011/0088016 | A1 | 4/2011 | Ball et al. | |
| 2011/0173594 | A1* | 7/2011 | Bartolomeo | G06F 11/36 717/141 |
| 2011/0282710 | A1* | 11/2011 | Akkiraju et al. | 705/7.28 |
| 2011/0296388 | A1* | 12/2011 | Rohde | G06F 8/433 717/131 |
| 2012/0005540 | A1* | 1/2012 | England | G06F 11/3604 714/46 |
| 2012/0060142 | A1* | 3/2012 | Fliess | G06F 8/70 717/102 |
| 2012/0167060 | A1 | 6/2012 | Landwehr et al. | |
| 2012/0272220 | A1* | 10/2012 | Calcagno | G06F 8/77 717/125 |
| 2012/0303910 | A1* | 11/2012 | Ma | 711/154 |
| 2013/0055205 | A1* | 2/2013 | Sereni | G06F 8/75 717/124 |
| 2013/0159964 | A1 | 6/2013 | Szpak | |
| 2013/0238940 | A1* | 9/2013 | Chalmers et al. | 714/41 |
| 2014/0033176 | A1* | 1/2014 | Rama | G06F 11/3688 717/124 |
| 2014/0068564 | A1 | 3/2014 | Jain et al. | |
| 2014/0123110 | A1* | 5/2014 | Wan et al. | 717/124 |
| 2014/0157061 | A1* | 6/2014 | Bird | G06F 11/008 714/47.1 |
| 2014/0157239 | A1* | 6/2014 | Goetsch | G06F 11/3604 717/126 |
| 2014/0282406 | A1* | 9/2014 | Narasimhan | G06F 11/008 717/124 |
| 2014/0344775 | A1* | 11/2014 | Dunne et al. | 717/101 |
| 2014/0344776 | A1* | 11/2014 | Dunne | G06Q 10/06 |
| 2015/0052403 | A1* | 2/2015 | Garrett | G06F 11/366 714/38.11 |
| 2015/0339217 | A1* | 11/2015 | Avgerinos | G06F 11/3608 717/132 |
| 2016/0004626 | A1* | 1/2016 | Jain | G06F 11/3684 717/130 |
| 2016/0203071 | A1* | 7/2016 | Cai | G06F 11/3616 717/126 |
| 2016/0378618 | A1* | 12/2016 | Cmielowski | G06F 11/1479 714/38.1 |

OTHER PUBLICATIONS

Lyle Holsinger, Prevent Vs FindBugs Application and Evaluation, 2008, pp. 1-15.*

Nachiappan Nagappan, Static Analysis Tools as Early Indicators of Pre-Release Defect Density, 2005, pp. 1-8.*

Nachiappan Nagappan, Preliminary Results on Using Static Analysis Tools for Software Inspection, 2004, pp. 1-11.*

Shubhangi Khare, Static Program Analysis of Large Embedded Code Base: An Experience, Thiruvananthapuram, Kerala, India—Feb. 24-27, 2011 ACM New York, NY, USA © 2011 table of contents ISBN: 978-1-4503-0559-4 doi>10.1145/1953355. 1953368. Retrieved from the internet: <http://dl.acm.org/citation.cfm?id=1953368>; pp. 1-4.*

Kostyantyn Voroboyov, Comparing Model Checking and Static Program Analysis: A Case Study in Error Detection Approaches, 2010, pp. 1-7. https://www.usenix.org/legacy/event/ssv10/tech/full_papers/Vorobyov.pdf (Year: 2010).*

Adrian Nistor, Toddler: Detecting Performance Problems via Similar Memory-Access Patterns, 2013, pp. 1-10. https://dl.acm.org/citation.cfm?id=2486862 (Year: 2013).*

Martin Johns, Scanstud: A Methodology for Systematic, Fine-grained Evaluation of Static Analysis Tools, 2011, pp. 523-530. https://ieeexplore.ieee.org/stamp/stamp.jsp?tp=&arnumber=5954458 (Year: 2011).*

Ciera Christopher Jaspan, Understanding the Value of Program Analysis Tools, 2007, pp. 1-8. http://www.cs.cmu.edu/~./cchristo/docs/jaspan-OOPSLA07-ERT.pdf (Year: 2007).*

Vadim Okun, Report on the Static Analysis Tool Exposition (SATE) IV, 2013, pp. 1-35. https://nvlpubs.nist.gov/nistpubs/Special Publications/NIST.SP.500-297.pdf (Year: 2013).*

Muhammad Dhiauddin Mohamed Suffian, A Prediction Model for System Testing Defects using Regression Analysis, 2012, pp. 55-66. https://arxiv.org/ftp/arxiv/papers/1401/1401.5830.pdf (Year: 2012).*

Thomas Zimmermann, Predicting Bugs from History, 2008, pp. 69-84. http://research.cs.queensu.ca/~ahmed/home/teaching/CISC880/F11/papers/PredictingBugs_EvolutionBook.pdf (Year: 2008).*

Dwight Eisenhower, Static Analysis as Part of the Code Review Process, 2007, pp. 47-70. https://cdn.ttgtmedia.com/searchSoftwareQuality/downloads/Secure_Programming_CH03Chess.pdf (Year: 2007).*

Nathaniel Ayewah, Evaluating Static Analysis Defect Warnings on Production Software, 2007, pp. 1-7. http://findbugs.cs.umd.edu/papers/FindBugsExperiences07.pdf (Year: 2007).*

Edward Aftandilian, Building Useful Program Analysis Tools Using an Extensible Java Compiler, 2012, pp. 1-10. https://static.googleusercontent.com/media/research.google.com/en//pubs/archive/38275.pdf (Year: 2012).*

"Data-flow analysis" from Wikipedia, the free encyclopedia, located at: http://en.wikipedia.org/wiki/Data_flow_analysis#Backward_Analysis, downloaded May 14, 2014 (8 pages).

"Static Code Analysis" from OWASP, located at: https://www.owasp.org/index.php/Static_Code_Analysis, downloaded May 14, 2014 (7 pages).

"Static program analysis" from Wikipedia, the free encyclopedia, located at: http://en.wikipedia.org/wiki/Static_program_analysis,downloaded May 14, 2014 (5 pages).

Nagappan, et al., "Preliminary Results on Using Static Analysis Tools for Software Inspection," Software Reliability Engineering, 2004. ISSRE 2004. 15th International Symposium on. IEEE, 2004 (11 pages).

(56) References Cited

OTHER PUBLICATIONS

Notice of Allowance dated Sep. 22, 2015, for U.S. Appl. No. 14/106,527 (35 pages).
Corrected Notice of Allowance dated Oct. 8, 2015, for U.S. Appl. No. 14/106,527 (23 pages).
Beyer et al., "The software model checker BLAST Applications to software engineering", Int J Softw Tools Technol Transfer (2007) 9: 505-525 (21 pages).
Nakamura, Ken-ichiro et. al., "Automatic Generation and Insertion of Errors in a Seeding Model," The Special Interest Group Technical Reports of IPSJ, vol. 91; No. 66, pp. 111-118, Jul. 1991.

* cited by examiner

RISK ANALYSIS OF CODEBASE USING STATIC ANALYSIS AND PERFORMANCE DATA

BACKGROUND

The specification relates to risk analysis of codebase using static analysis and performance data.

Identifying bugs that exist in source code can often be a difficult task. Some existing static analysis tools can analyze source code to find such bugs, however, there generally always exist some false positives (bugs detected but actually are not bugs) in the analysis results produced by these tools. As a result, classification of the source code as bug-free code or buggy code often requires manual intervention and analysis, which is not only time consuming but also disadvantageously requires a large amount of engineering effort to address. Further, using an existing analysis tool it is difficult to accurately produce an overall risk assessment that assesses whether the source code actually includes defects because the analysis results produced by the analysis tool includes false positive indications. This can make the software quality assurance process very resource intensive and difficult to manage.

SUMMARY

According to one innovative aspect of the subject matter described in this disclosure, a system includes one or more processors and one or more memories storing instructions that, when executed by the one or more processors, cause the system to, calculate performance statistics for a set of analysis tools; analyze a codebase using one or more analysis tools from the set of analysis tools; generate an analysis result for each analysis tool of the one or more analysis tools, the result describing one or more faults and one or more validations identified by the corresponding analysis tool; and estimate a risk of defects in the codebase based on the analysis result associated with each of the one or more analysis tools and the performance statistics associated with each of the one or more analysis tools.

In general, another innovative aspect of the subject matter described in this disclosure may be embodied in methods that include calculating, using one or more computing devices, performance statistics for a set of analysis tools; analyzing, using the one or more computing devices, a codebase using one or more analysis tools from the set of analysis tools; generating, using the one or more computing devices, an analysis result for each analysis tool of the one or more analysis tools, the result describing one or more faults and one or more validations identified by the corresponding analysis tool; and estimating, using the one or more computing devices, a risk of defects in the codebase based on the analysis result associated with each of the one or more analysis tools and the performance statistics associated with each of the one or more analysis tools.

Other aspects include corresponding methods, systems, apparatus, and computer program products for these and other innovative aspects.

These and other embodiments may each optionally include one or more of the following features and/or operations. For instance, the operations include: storing, using the one or more computing devices, a plurality of software codebases for determining performance statistics for the set of analysis tools; storing, using the one or more computing devices, verification data reflecting known, intentionally included faults in the plurality of software codebases; analyzing, using the one or more computing devices, the plurality of software codebases with each analysis tool of the set; comparing, using the one or more computing devices, an output of each analysis tool of the set to the verification data to determine the performance statistics of the analysis tool; determining, using the one or more computing devices, a total number of lines in the codebase; computing, using the one or more computing devices, a probability of a defect for each line in the codebase; computing, using the one or more computing devices, an expected number of defects in the codebase based on the total number of lines in the codebase and the probability of the defect for each line in the codebase; estimating, using the one or more computing devices, a risk of hidden defects in the codebase based on the analysis result associated with each of the one or more analysis tools and the performance statistics associated with each of the one or more analysis tools; that the risk of hidden defects describes one or more lines of the codebase as having defects that were determined to be defect-free or non-analyzable by the one or more analysis tools; performing, using the one or more computing devices, a quality assurance task based on the risk of defects estimated in the codebase; that estimating the risk of defects in the codebase further includes classifying, using the one or more computing devices, the one or more faults into actual faults or false faults based on the performance statistics associated with the one or more analysis tools of the set; and that classifying the one or more faults into actual faults or false faults includes computing, using the one or more computing devices, an aggregate probability of defect in one or more lines of the codebase based on the performance statistics associated the one or more analysis tools of the set, computing, using the one or more computing devices, an aggregate probability of no defect in the one or more lines of the codebase based on the performance statistics associated with the one or more analysis tools of the set, and comparing, using the one or more computing devices, the aggregate probability of defect and the aggregate probability of no defect to classify the one or more faults into the actual faults or the false faults. For instance, the features include: that the performance statistics include one or more of a defect detection rate, a false positive defect detection rate, a complement of the defect detection rate, a complement of the false positive defect detection rate, and for each analysis tool in the set; and that the quality assurance task includes an optimal resource assignment or a prioritized bug ticketing.

The disclosure is particularly advantageous in a number of respects. For example, the technology described herein can be used to mitigate false positive results produced by a set of analysis tools and detect actual faults in the source code of a software program. Further, the technology can identify any hidden faulty lines in the source code regardless of those lines being identified as safe or fault-free by the set of analysis tool. In addition, the technology can classify one or more of faults identified by the set of analysis tools into highly likelihood faults based on performance information for different types of faults including, for example, buffer overrun, division by zero, null pointer dereference, etc. It should be understood that the foregoing advantages are provided by way of example and the technology may have numerous other advantages and benefits.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Overview

Figure 1:
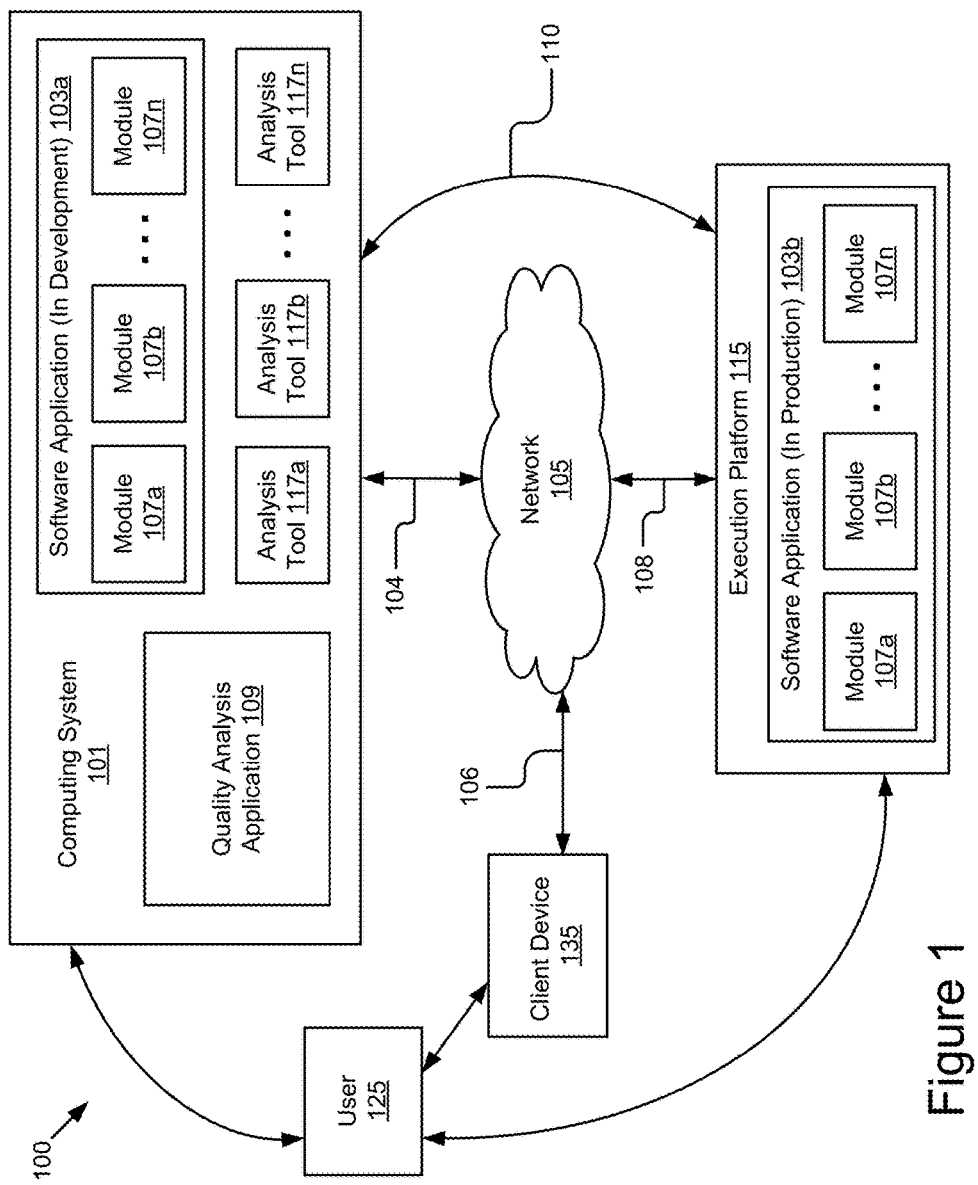
FIG. 1 is a block diagram illustrating an example system for estimating the risk of defects in a codebase.

FIG. 1 is a block diagram illustrating an example system 100 for estimating risk of defects in a codebase. The illustrated system 100 includes a computing system 101, a client device 135, and an execution platform 115. In some embodiments, the entities of the system 100 are communicatively coupled via a network 105. The computing system 101 may be communicatively coupled to the execution platform 115 via the network 105 and/or more directly via signal line 110. A user 125 can interact (e.g., use, provide input, view results, etc.) with the client device 135, the computing system 101, and/or the execution platform 115.

The network 105 can be a conventional type, wired or wireless, and may have numerous different configurations including a star configuration, token ring configuration, or other configurations. Furthermore, the network 105 may include one or more local area networks (LAN), wide area networks (WAN) (e.g., the Internet), public networks, private networks, virtual networks, and/or other interconnected data paths across which multiple devices may communicate. In some embodiments, the network 105 may be a peer-to-peer network. The network 105 may also be coupled to or include portions of a telecommunications network for sending data in a variety of different communication protocols. In some embodiments, the network 105 includes near-field (e.g., Bluetooth®) communication networks or a cellular communications network for sending and receiving data including via short messaging service (SMS), multimedia messaging service (MMS), hypertext transfer protocol (HTTP), direct data connection, WAP, email, etc. Although FIG. 1 illustrates one network 105 coupled to the computing system 101, the client device 135, and the execution platform 115, in practice one or more networks 105 can be connected to these entities.

The computing system 101 can be a computing device that may include a memory and a processor, for example a laptop computer, a desktop computer, a workstation, a server, a tablet computer, a mobile telephone, a personal digital assistant (PDA), a mobile email device or any other electronic device capable of processing information and accessing a network 105. As depicted, the computing system 101 is connected to the network 105 via signal line 104. In some embodiments, the computing system 101 can send and receive data to and from the execution platform 115 and/or the client device 135. For example, the computing system 101 can download the software application 103a, or various updates thereto, to the execution platform 115 as the software application 103b, causing the execution platform 115 to execute the software application 103b. The user 125 can interact with the computing system 101. Although FIG. 1 illustrates one computing system 101, the system 100 can include one or more computing systems 101.

In some embodiments, a user may access the computing system 101 directly using various input and output devices (e.g., keyboard, pointer device, etc.) or may access the system remotely via the network 105 and the client device 135. In some cases, the computing system 101 may include a server accessible via the network 105 using the client device 135. In further cases, the computing system 101 can include a workstation that a user 125 can operate to test and/or develop the software application 103a. Other variations are also possible.

As depicted, the computing system 101 can include a quality analysis application 109, a software application 103a in development, and a set of analysis tools 117a, 117b . . . 117n (also individually and/or collectively referred to herein as 117). The software application 103a is embodied by a codebase or source code (used interchangeably) having a plurality of lines of code comprising various definitions, functions, routines, methods, logic, etc. A line of code can include one or more characters followed by an end of line marker (e.g., carriage return, next line, line feed, etc.), although other variations are possible. In addition, the software application 103a can include a plurality of code modules 107a, 107b . . . 107n (also individually and/or collectively referred to herein as 107). Each code module 107a, 107b . . . 107n may implement one or more functions for the software application 103a. The module(s) 107 may be included in a single file, multiple files, etc., which embody the codebase.

The software application 103a may be in-development and developers may use the analysis tools 117 in cooperation with the quality analysis application 109 to test the software application 103a for bugs. In some embodiments, the software application 103a may be designed for and executable by an embedded system, such as the execution platform 115. For instance, once fully tested, the software application 103*a* may be ready for formal release and loaded onto an execution platform 115 as software application 103*b*.

The quality analysis application 109 can include logic for estimating risk of defects in a software codebase using analysis results produced by one or more analysis tools 117 and performance statistics associated with the one or more analysis tools 117. For instance, an analysis result produced by an analysis tool may include one of faulty, fault-free, and non-analyzable status for each line of the codebase, and a performance statistics for the analysis tool may include the tool's detection rate and/or false positive rate. The quality analysis application 109 may use the analysis result and the performance statistics to estimate an overall risk of defects in the codebase as described in further detail below with reference to at least FIGS. 2-5.

In some embodiments, the quality analysis application 109 can be implemented using software executable by one or more processors of one or more computer devices. In some embodiments, the quality analysis application 109 may be stored in and distributed across a combination of the devices and servers, or in one of the devices or servers. For example, various components of the quality analysis application 109, such as the interface module 210 or other components, may be included on a client device 135, the computing system 101, another computing device coupled to the network 105, etc.

The analysis tools 117 can include tools for analyzing a software codebase and/or modules (e.g., having one or more lines of a software source code) to determine whether the software codebase and/or module(s) have any faults (e.g., errors, bugs, defects, etc.) associated with them. For simplicity, when referring generally to a software codebase herein, it should be understood that the codebase could include one or more modules. In some embodiments, analysis tools 117 can include one or more semantics-based static analysis tools. The analysis tools 117*a* . . . 117*n* may include stand-alone analysis tools, may include plug-ins that can integrate with and extend the debugging functionality of the quality analysis application 109, etc. Example analysis tools 117 can include, but are not limited to, MathWorks PolySpace, Abslnt Astree, Klocwork Insight, Coverity, etc.

In some embodiments, an analysis tool 117 may analyze each line of the software codebase to determine whether the line is a safe (i.e., fault-free), an un-safe (i.e., faulty), and/or a non-analyzable (i.e., cannot be determined as safe/un-safe) line. In some embodiments, the analysis tool 117 may highlight each line of the codebase using color-coded markups to indicate its safe, unsafe, and/or non-analyzable status. For example, an analysis tool 117 can mark fault-free lines of code in green, unanalyzed lines of code in black, and faulty lines of code in red.

In some embodiments, each of the analysis tools 117 can generate an analysis result describing the findings of that tool, such as a summary of faults detected in the source codebase, the location of each instance of fault within the codebase, the portions of the codebase that were analyzable or unanalyzable, etc. Non-limiting types of faults that can be identified include, but are not limited to, static memory defects, dynamic memory defects, resource management defects, pointer-related defects, concurrency defects, inappropriate code defects, miscellaneous defects, etc.

The analysis tools 117 may store the results they produce in a data store, such as a file system or database, for access and/or retrieval by the quality analysis application 109 or can provide the results directly to the quality analysis application 109 for processing thereby. In some embodiments, the analysis tools 117 may store their results in the storage device 245, the tool database 249, the memory 237, etc., or may provide the results directly to another component. In some embodiments, the quality analysis application 109 may be coupled to the relevant data store and/or the analysis tools 117 to receive the tool-output results. In some embodiments, each result may be provided for presentation via the interface module 210 of the quality analysis application 109 (e.g., see FIG. 2). In some embodiments, analysis results may be provided on a line-by-line basis, a subroutine, function, method, variable, etc., basis a combination of the forgoing, etc.

The execution platform 115 can be a platform for implementing and executing software codebase. In some embodiments, the execution platform 115 is an embedded system execution platform 115 including hardware, software, or a combination of the foregoing. In some embodiments, the execution platform 115 may include a hardware device that can execute embedded software codebase, a hardware and/or software emulator for executing embedded software codebase, etc. Examples of an execution platform 115 may include, but are not limited to, an informatics system, a voice recognition system, an infotainment system, a tire pressure monitoring system, an adaptive cruise control system, a collision warning system, a night vision and lane warning system, or any other embedded system installed in a vehicle. Further examples include a user device such as a tablet, laptop, a desktop computer, a mobile phone, etc. It should be understood that while some examples and embodiments are described herein in the context of embedded systems and software in vehicles, in other embodiments this technology is applicable to any other embedded systems and/or software.

In some embodiments, the software application 103*a* can be downloaded from the computing system 101 to the execution platform 115 for execution and can be stored as in-production software application 103*b*. In some embodiments, the software application 103*a* and the software application 103*b* may reflect instances of the same software application that are in different phases (in-development vs. in-production). For instance, the software application 103*b* may have been tested and deemed suitable for release while the software application 103*a* may reflect the next version of the software application and may include various improvements or new features that are being tested for release.

As a further example, during a software update, or an initial deployment, the software application 103*a* may be deemed production ready after quality analysis has been performed, and may then be downloaded to the execution platform 115 for deployment as the in-production software application 103*b*. The execution platform 115 can execute the software application 103*b* to provide various results and/or output as appropriate. In various embodiments, the in-production software application 103*b* may be test, beta, full-release, etc., software.

The client device 135 can be a computing device that includes a memory and a processor, and various other components. For example, the client device 135 may be a laptop computer, a desktop computer, a tablet computer, a mobile telephone, a personal digital assistant (PDA), a mobile email device or any other electronic device capable of processing information and accessing a network 105. The client device 135 may be communicatively coupled to the network 105 via signal line 106. In some embodiments, the user 125 can interact with the client device 135. In some embodiments, the client device 135 can send and receive data to and from one or more of the computing system 101 and the execution platform 115, etc. For example, the client device 135 can receive data describing a total number of estimated faults in software codebase from the quality analysis application 109 and present the information to the user 125 via a user interface. Although FIG. 1 illustrates one client device 135, the system 100 can include one or more client devices 135.

Example Quality Analysis Application

Figure 2:
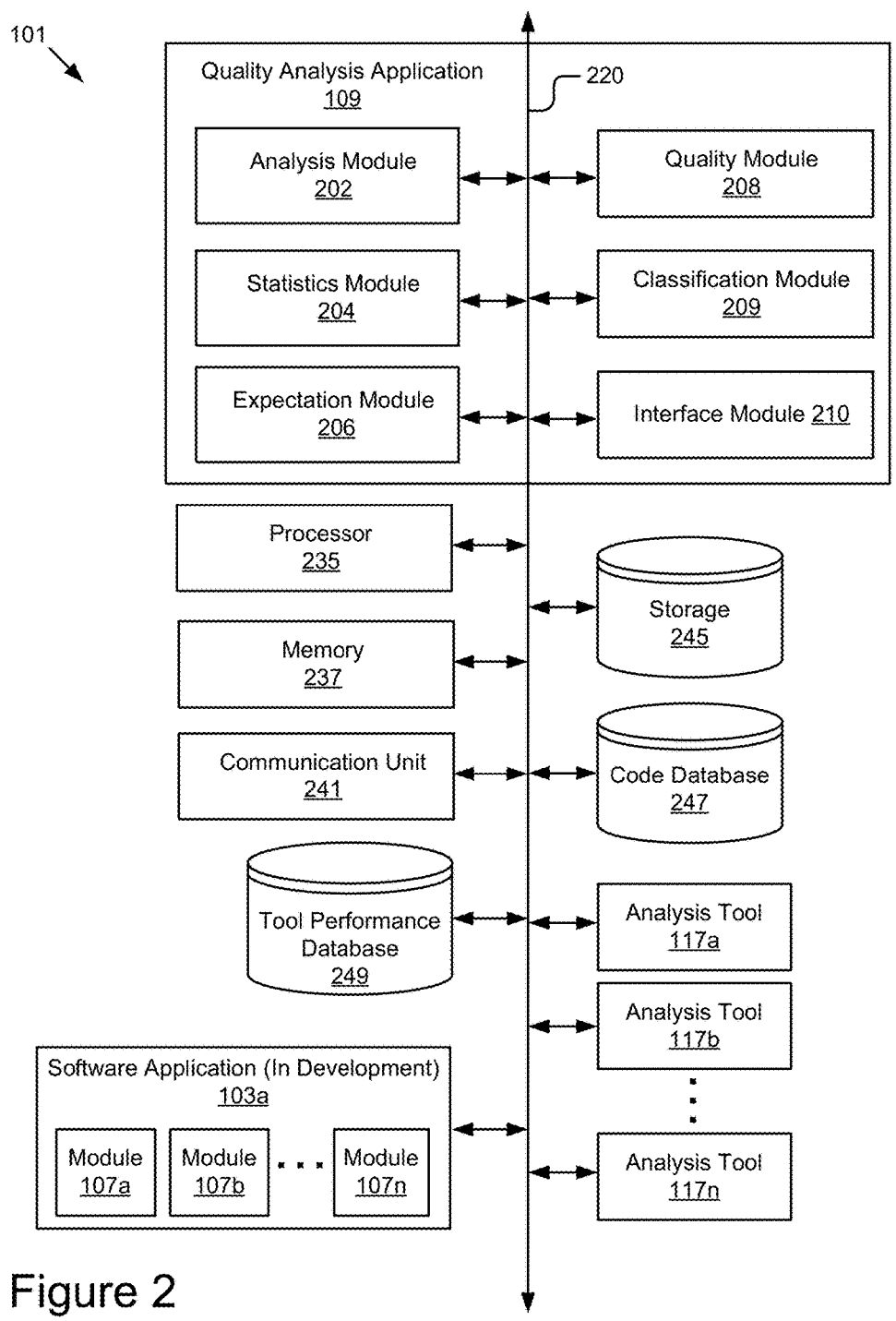
FIG. 2 is a block diagram illustrating an example computing system having an example quality analysis application.

Referring now to FIG. 2, an example computing system 101 having an example quality analysis application 109 is shown in more detail. As shown, the computing system 101 may include a quality analysis application 109, a processor 235, a memory 237, a communication unit 241, a storage device 245, a code database 247, a tool performance database 249, a software application 103a, and analysis tools 117a, 117b . . . 117n according to some embodiments. The components of the computing system 101 are communicatively coupled by a bus 220. The bus 220 can include any type of conventional communication bus for transferring data between components of a computing device, or between computing devices.

The processor 235 can include one or more processing units, such as an arithmetic logic unit, a microprocessor, a general purpose controller, a specialized processing unit, or some other processor array to perform computations and provide electronic display signals to a display device. The processor 235 can process data signals and may include various computing architectures including a complex instruction set computer (CISC) architecture, a reduced instruction set computer (RISC) architecture, an architecture implementing a combination of instruction sets, etc. In some embodiments, the processor 235 may be one of a general processor, a special-purpose processor such as an application specific integrated circuit (ASIC), a field programmable gate array (FPGA), a digital signal processor (DSP), a network processor, or the like. Although FIG. 2 depicts a single processor 235, multiple processors 235 may be included. Other processors, operating systems, sensors, displays and physical configurations are possible.

The memory 237 includes one or more non-transitory computer-readable media for storing instructions and/or data that can be executed by the processor 235. The instructions and/or data may include code for performing the techniques described herein. In some embodiments, the memory 237 can store the quality analysis application 109. The memory 237 may include a dynamic random access memory (DRAM) device, a static random access memory (SRAM) device, embedded memory, flash memory, or some other memory device. In some embodiments, the memory 237 can also include a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

The communication unit 241 can transmit and receive data to and from other computing devices coupled to the network 105, such as the execution platform 115 and/or the client device 135. The communication unit 241 may be coupled (wiredly, wirelessly, etc.) to the network 105 to communicate with other entities forming the network 105. In some embodiments, the communication unit 241 may include one or more ports for direct physical connection to the network 105 or to another communication channel. For example, the communication unit 241 may include a USB, SD, CAT-type, Thunderbolt, or similar port for wired communication with the execution platform 115 and/or the client device 135. In some embodiments, the communication unit 241 may include a wireless transceiver for exchanging data with the execution platform 115 or other communication channels using one or more wireless communication methods, including IEEE 802.11, IEEE 802.16, BLUETOOTH®, dedicated short-range communications (DSRC) or another suitable wireless communication method. In some embodiments, the communication unit 241 can include a cellular communications transceiver for sending and receiving data over a cellular communications network including any generation (3G, 4G, 5G+, etc.) mobile network. In some embodiments, the communication unit 241 can include one or more wired ports and wireless transceivers. The communication unit 241 can also provide other conventional connections to the network 105 for distribution of files and/or media objects using standard network protocols including TCP/IP, HTTP, HTTPS, and SMTP, etc.

The storage device 245 can include hardware and/or software for storing and providing access to data. The storage device 245 may be included in the computing system 101 or may comprise or be included in another computing device and/or storage system distinct from but coupled to or accessible by the computing system 101. In some embodiments, the storage device 245 may be incorporated with the memory 237 or may be distinct therefrom. In some embodiments, the storage device 245 may include a database management system (DBMS), one or more file system partitions, etc. for storing and providing access to data. The storage device 245 may include one or more non-transitory computer-readable media, such as solid state memory (e.g., flash memory, RAM, etc.), a hard drive, tape system, a floppy disk drive, a CD-ROM device, a DVD-ROM device, a DVD-RAM device, a DVD-RW device, or some other mass storage device for storing information. In some embodiments, the storage device 245 can store one or more of tool-generated analysis results generated by analysis tools 117, quality analysis results produced by the quality analysis application 109, user data, preferences, system files, various application and operating system files, etc.

The code database 247 includes an information source for storing and providing access to software codebase (e.g., source code, lines of code, code modules 107, compiled objects, etc.). The code database 247 may be included in the computing system 101 or may comprise or be included in another computing device and/or storage system distinct from but coupled to or accessible by the computing system 101. The code database 247 may include hardware and/or software for storing and providing access to the software codebase of various software applications, such as the software application 103a. In some embodiments, the code database 247 may be incorporated with the memory 237 and/or the storage device 245, or may be distinct therefrom. In some embodiments, the code database 247 may include a versioning control system (VCS) operable by the computing system 101 for managing changes to the software stored thereby. Examples of VCSs may include CVS, subversion, Git, etc. In some embodiments, the code database 247 may include or be included in a database management system (DBMS) operable by the computing system 101. For example, the DBMS could include a structured query language (SQL) DBMS, a NoSQL DMBS, various combinations thereof, etc. In some instances, the DBMS may store data in multi-dimensional tables comprised of rows and columns, and manipulate, i.e., insert, query, update and/or delete, rows of data using programmatic operations. The code database 247 may include or be included in one or more non-transitory computer-readable media, such as solid state memory (e.g., flash memory, RAM, etc.), a hard drive, tape system, a floppy disk drive, a CD-ROM device, a DVD-ROM device, a DVD-RAM device, a DVD-RW device, or some other mass storage device for storing information.

The tool performance database 249 can include a non-transitory storage medium that can store data associated with analysis tools 117. In some embodiments, the tool performance database 249 may include a database management system (DBMS) and/or file system for storing and providing access to data. The tool performance database 249 may include or be included in solid state memory (e.g., flash memory, RAM, etc.), a hard drive, tape system, a floppy disk drive, a CD-ROM device, a DVD-ROM device, a DVD-RAM device, a DVD-RW device, or some other mass storage device for storing information.

In some embodiments, the tool performance database 249 can store performance statistics associated with analysis tools 117. For instance, the tool performance database 249 may store one or more of a detection rate and a false positive rate for each of the analysis tools 117. The detection rate for an analysis tool 117 can describe a rate at which the analysis tool 117 is capable of detecting faults. The false positive rate for an analysis tool 117 can describe a rate at which the analysis tool 117 may produce a positive result (e.g., indication of a fault) when no fault exists. In some embodiments, the tool performance database 249, the code database 247, and/or the storage device 245 may be integrated into a single data storage component or system or may be or be included distinct storage components or systems.

In some embodiments, the tool performance database 249 along with storing the detection rate (DR), the false positive rate (FPR), for each analysis tool 117 can also store a complement value for each rate of the tool. For instance, the tool performance database 249 can store complement rate to the detection rate (i.e., 1-DR) as (DR'), and/or a complement rate to the false positive rate (i.e., 1-FPR) as (FPR'), etc. In some embodiments, the tool performance statistics including a detection rate, false positive rate, and their complements for each tool may be calculated and stored by the statistics module 204 as described below with reference to the statistics module 204.

As depicted in FIG. 2, the quality analysis application 109 can, in some embodiments, include an analysis module 202, a statistics module 204, an expectation module 206, a quality module 208, a classification module 209, and an interface module 210. These components may be communicatively coupled via the bus 220 and/or the processor 235. In some embodiments, the analysis module 202, the statistics module 204, the expectation module 206, the quality module 208, the classification module 209, and the interface module 210 may be sets of instructions executable by the processor 235. In some embodiments, the analysis module 202, the statistics module 204, the expectation module 206, the quality module 208, the classification module 209, and the interface module 210 can be stored in the memory 237 of the computing system 101 and can be accessible and executable by the processor 235. The analysis module 202, the statistics module 204, the expectation module 206, the quality module 208, the classification module 209, and the interface module 210 may be adapted for cooperation and communication with the processor 235 and the other components of the computing system 101.

The analysis module 202 can include software and/or hardware logic for analyzing a software codebase to determine faults in the codebase. One or more analysis tools 117 can be applied to analyze a given source codebase. Each analysis tool 117 can generate a result describing its findings, including which lines of the codebase are faulty, which lines of the codebase are fault-free, which lines of the codebase are un-analyzable, etc. The analysis module 202 may be coupled to receive analysis results directly from an analysis tool 117 and/or from a data store, such as the tool performance database 249, the storage 245, etc. The analysis module 202 may receive a set of analysis results produced by a set of one or more analysis tools 117 and may send the analysis results to the expectation module 206, which may then use the results to perform its acts and/or functionalities as described elsewhere herein. In some embodiments, the analysis module 202 may store the analysis results produced by the analysis tools 117 in a data store, such as the storage device 245, the tool performance database 249, etc., for access and retrieval by one or more components of the quality analysis application 109.

In some embodiments, analysis results produced by a set of analysis tools 117 may include, for example, indication of lines in a software codebase that were determined as faulty by one or more analysis tools 117 of the set, indication of the lines in the codebase that were determined as fault-free, indication of the lines that were determined as un-analyzable, color-coded mark ups indicating each line in the codebase as faulty, fault-free, and/or un-analyzable, etc. In some embodiments, the analysis module 202 may receive analysis results from one or more tools in a set of analysis tools 117 and generate an overall analysis summary describing the software codebase quality. For example, the overall analysis summary may include, without limitation, number of analysis tools 117 from the set identifying one or more lines of the codebase as safe vs. number of tools 117 identifying the one or more lines as faulty, total number of defects identified by the set of analysis tools 117, types of defects identified by the analysis tools 117, a comparison between the analysis tools 117, etc.

In some embodiments, the analysis module 202 may store the overall analysis summary in a data store, such as the storage device 245, for access and retrieval by one or more components of the quality analysis application 109. In some embodiments, the analysis module 202 may provide the analysis summary to the interface module 210 for presentation to a user 125. Providing the summary for presentation to a user is advantageous as the user using the summary can understand the relative strengths and weaknesses of each tool, make an informed decision regarding whether one or more lines identified as faulty actually needs attention based on a total number of analysis tools 117 from a set identifying those lines as faulty, etc.

Figure 7:
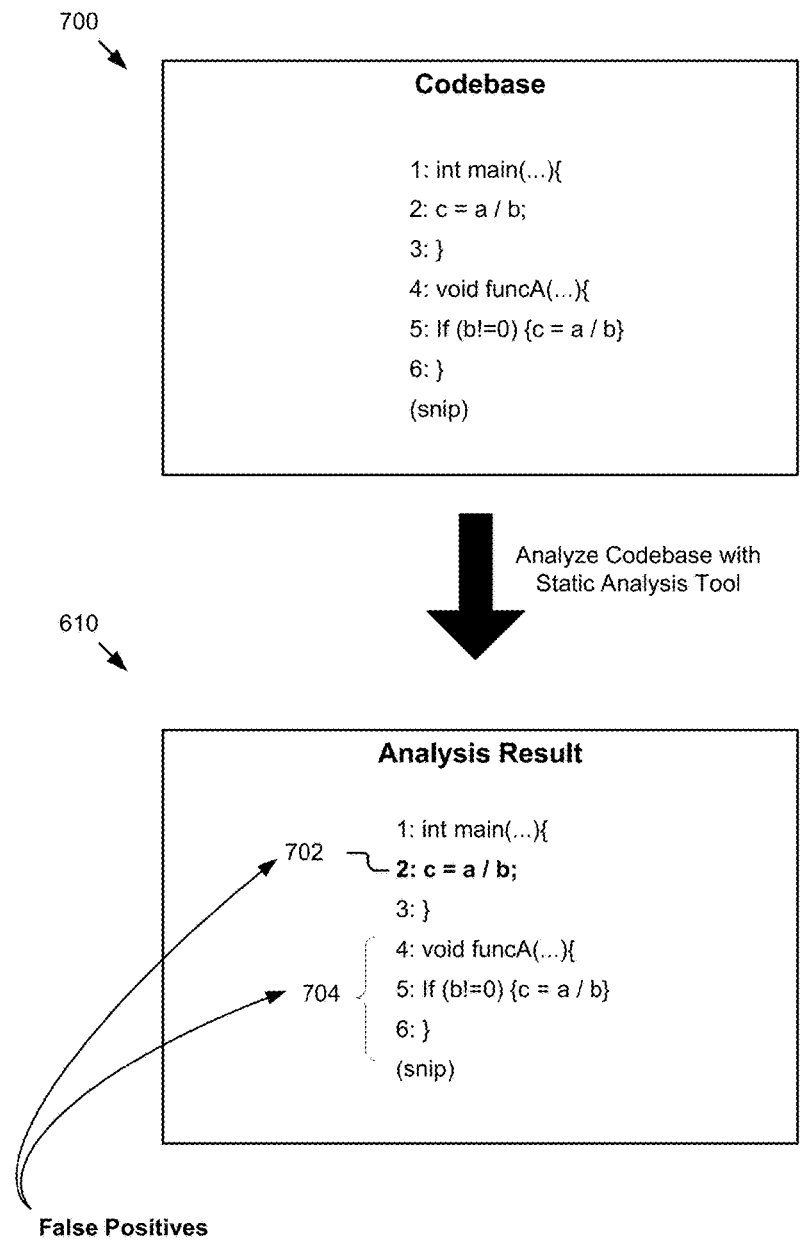
FIG. 7 illustrates an example codebase and analysis results generated based on analyzing the codebase.

By way of a further example, FIG. 7 illustrates an example codebase 700 and analysis results 610 generated responsive to analyzing the codebase 700. As depicted, the codebase 700 includes two function calls using six lines of code. In particular, lines 1-3 represent a first function "int main ( . . . )" (e.g., an integer value returning function) where an integer value for variable 'c' is declared. Lines 4-6 represent a second function "void funcA ( . . . )" (e.g., a no value returning function) where a condition for setting the value of variable c is specified. In some embodiments, the first function and the second function may each be referred to as a code module.

In some embodiments, the analysis module 202 may analyze each line of the codebase 700 by using one or more analysis tools 117. The analysis tools 117 may generate one or more analysis results and provide those results to the analysis module 202 for processing and/or storage. For instance, as depicted in FIG. 7, the analysis tool 117 may analyze the codebase 700 and generate analysis result 610 and provide the result to the analysis module 202. In some embodiments, the analysis module 202 may signal the analysis of the codebase by a given analysis tool 117, and the analysis tool 117 may perform the analysis and provide its result back to the analysis module 202, although other variations are possible, such as a user may use the analysis tool 117 independently and feed the results to the analysis module 202 (e.g., by importing the results).

The analysis result 610 may indicate for each line in the codebase 700 whether the line is a faulty, fault-free, and/or a non-analyzable line. As depicted in the analysis result 610, reference numeral 702 indicates that line 2 is a faulty line and reference numeral 704 indicates that lines 4-6 are non-analyzable. In some embodiments, the analysis result 610 may include indicators for other defects and/or validations, such as indicators for one or more false positive results. For example, line 2 as indicated by the analysis tool 117 to be faulty may actually not be faulty and hence be a false alarm or false positive produced by the tool.

In some embodiments, lines of the codebase 700 in the analysis result 610 may be highlighted with different colors to indicate their faulty, fault-free, and/or non-analyzable status. For example, a line may be highlighted with a red color to indicate that it is a faulty line, a line may be highlighted with a green color to indicate it is a fault-free line, and/or a line may be highlighted with a black color to indicate that it is a non-analyzable line. Using this example, the faulty line as indicated by reference numeral 702 may be presented in red and the non-analyzable lines as indicated by reference numeral 704 may be presented in black. The analysis module 202 may receive the result 610 from the analysis tool 117 and then either store the result 610 in a data store (e.g., the storage device 245) or send the result 610 to the expectation module 206 for further processing.

The statistics module 204 can include software and/or hardware logic for calculating performance statistics for a set of analysis tools 117. The performance statistics may include a detection rate, a false positive, and a complement for each of the detection rate, and/or the false positive rate, as described elsewhere herein. In some embodiments, the statistics module 204 may provide the performance statistics it calculates to the expectation module 206 and/or the classification module 209, which may then use the statistics to perform its acts and/or functionalities as described elsewhere herein. In some embodiments, the statistics module 204 may store the performance statistics calculated for each of the analysis tools 117 in a data store, such as the storage device 245 or the tool performance database 249, for access and retrieval by one or more components of the quality analysis application 109.

In some embodiments, performance statistics may describe for each of the analysis tools 117, how proficient the analysis tool 117 is in correctly identifying faults in software codebase. For instance, a detection rate for an analysis tool 117 can describe a rate at which the analysis tool 117 is capable of detecting faults. For example, a detection rate of 80% can indicate that an analysis tool 117 is capable of detecting 80% of the faults in the software codebase. A false positive rate for an analysis tool 117 can describe a rate at which the analysis tool 117 may produce a positive result (e.g., indication of a fault) when no fault exists. A false positive result can also be referred to as a false alarm. For example, a false positive rate of 5% can indicate that 5% of the faults detected by an analysis tool 117 are false alarms (not actually faults).

In some embodiments, the statistics module 204 may calculate a complement rate for each of the detection rate, and/or the false positive rate. For instance, the statistics module 204 may calculate the complement for the detection rate as 1-detection rate, complement for the false positive rate as 1-false positive rate, etc., in tool performance statistics 620 table in FIG. 14. By way of a further example, if detection rate of an analysis tool is 80% and false positive rate is 10% then the statistics module 204 may calculate the complement for the detection rate as 20% (1−0.8=0.2) and the complement for the false positive rate as 90% (1−0.1=0.9).

In some embodiments, the statistics module 204 may store various tool verification codebases in the code database 247 for the purpose of calculating performance statistics for a set of analysis tools 117. Each verification codebase stored by the statistics module 204 may contain fault-free lines of code and lines of code that include known, intentionally included faults. The statistics module 204 may maintain verification data reflecting the characteristics of the known, intentionally included faults, such as their locations in the codebases, their types, length, make-up, etc. The verification codebases and corresponding verification data may be used to evaluate the performance of each of the analysis tools 117. In some embodiments, the intentional faults may be inserted into a given codebase based on a user input. For example, a user may define different types of faults and/or fault variations, and the statistics module 204 may receive the user defined faults, via the interface module 210, and then insert the faults into the software codebases and generate verification data to track those faults. In further embodiments, the statistics module 204 may be capable to automatically generate and insert the faults into the software codebases and track the faults using verification data.

The statistics module 204 may then signal the analysis module 202 to analyze one or more of the verification codebases using the set of analysis tools 117. Each analysis tool 117 can analyze the codebases for faults and generate tool-output result describing the faults identified by the analysis tool 117. The analysis module 202 may receive tool-output results from the set of analysis tools 117 and send the results to the statistics module 204. Upon receiving the results, the statistics module 204 may compare the tool-output results with the verification data to generate an evaluation result for each analysis tool 117. For instance, the statistics module 204 may compare the known and intentionally included faults in the verification data with the tool-output results to determine which analysis tools 117 identified these faults as actually faults in their results. Using this comparison, the statistics module 204 can determine a detection rate (e.g., number of known faults correctly identified as faults), false positive rate (e.g., number of known fault-free lines identified as faulty) for each analysis tool 117. In some embodiments, the statistics module 204 may store these rates (detection, false positive, etc.) for each analysis tool 117 as evaluation result or tool performance statistics in the tool performance database 249.

Figure 8:
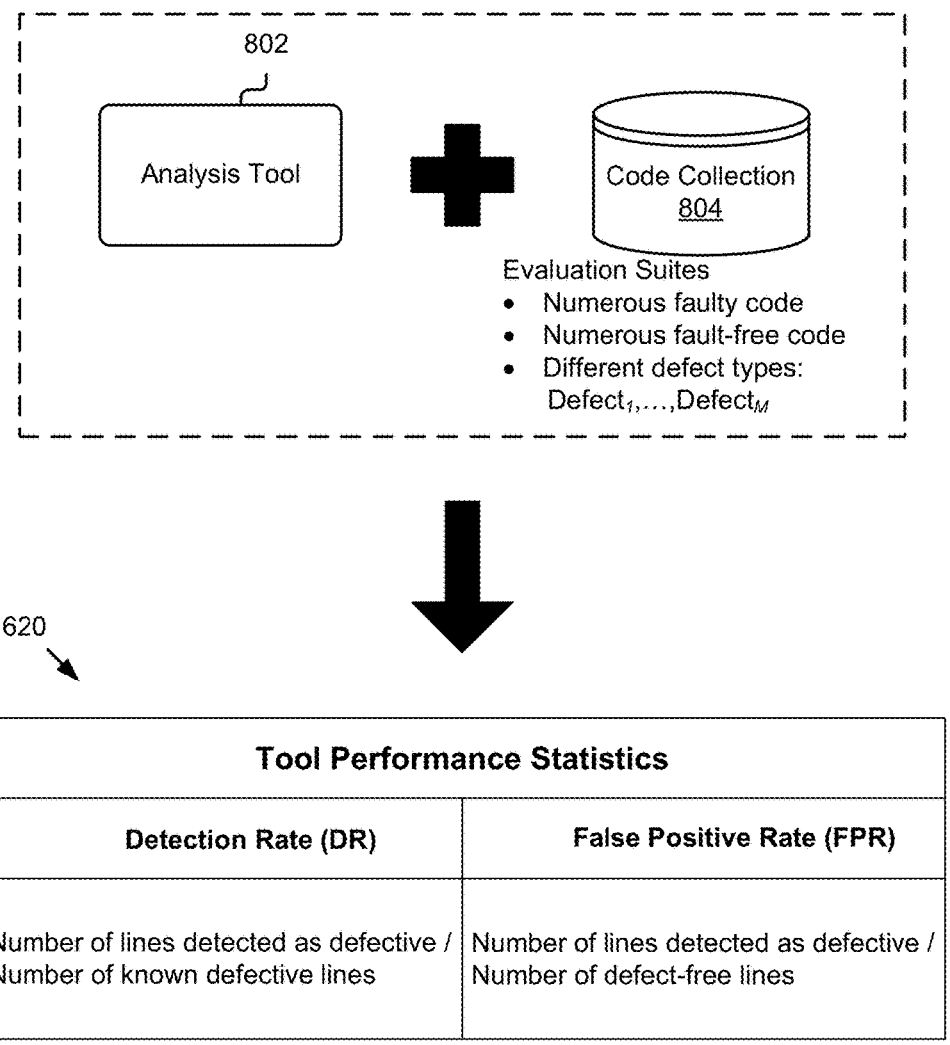
FIG. 8 illustrates example performance statistics generated based on evaluating an example code collection with an example analysis tool.

By way of an example, FIG. 8 illustrates example performance statistics 620 generated by evaluating an example code collection 804 with an example analysis tool 802. The statistics module 204 may generate and store the code collection 804 in a data store, such as the storage device 245. The code collection 804 may include a certain number of intentionally included faulty and fault-free lines of code, and different types of defects (e.g., $defect_1 \ldots defect_M$) for the purpose of determining, among other things, a detection rate and/or a false positive rate of the analysis tool 802 as described elsewhere herein. The statistics module 204 may then signal the analysis module 202 to analyze the code collection 804.

The analysis module 204 may use the analysis tool 802 to analyze the code collection 804 and send the result of the analysis to the statistics module 206. The statistics module 204 may then use the result and corresponding verification data to calculate the tool performance statistics 620. The tool performance statistics 620, as depicted, may provide a detection rate (DR) and false positive rate (FPR) for the analysis tool 802. The detection rate DR for the tool 802 as depicted in FIG. 8 may describe number of lines detected as defective by the tool 802 verses total number of known defective lines. Likewise, the false positive rate FPR for the tool 802 as depicted in the Figure may describe number of lines detected as defective by the tool 802 verses total number of known defect-free lines. In some embodiments, the statistics module 204 may provide the tool performance statistics 620 to the interface module 210 for presentation to a user, may send the statistics 620 to the expectation module 206 for further processing thereby, may store the tool performance statistics 620 in the tool performance database 249, etc.

The expectation module 206 can be software and/or logic for estimating an overall risk of defects in a software codebase and risk of hidden defects in the codebase. The overall risk of defects may include an expected number of defects (e.g., faults, bugs, errors, etc.) in the codebase. In some embodiments, the overall risk may cover the entire codebase. In some embodiments, the overall risk may cover certain module(s) of the codebase or portions thereof. The risk of hidden defects may describe a probability of defects in lines of the codebase that were determined earlier as fault-free and/or non-analyzable by one or more analysis tools 117. In some embodiments, the expectation module 206 may estimate the overall risk of defects and the risk of hidden defects based on analysis results produced by analysis tools 117 and performance statistics calculated for the analysis tools 117. The expectation module 206 may be communicatively coupled to the analysis module 202 and the statistics module 204 to receive the analysis results and the performance statistics, respectively. In some embodiments, the expectation module 206 may receive the analysis results and the performance statistics for the analysis tools 117 from the storage device 245 and the tool performance database 249, respectively. Other variations are also possible.

Figure 6:
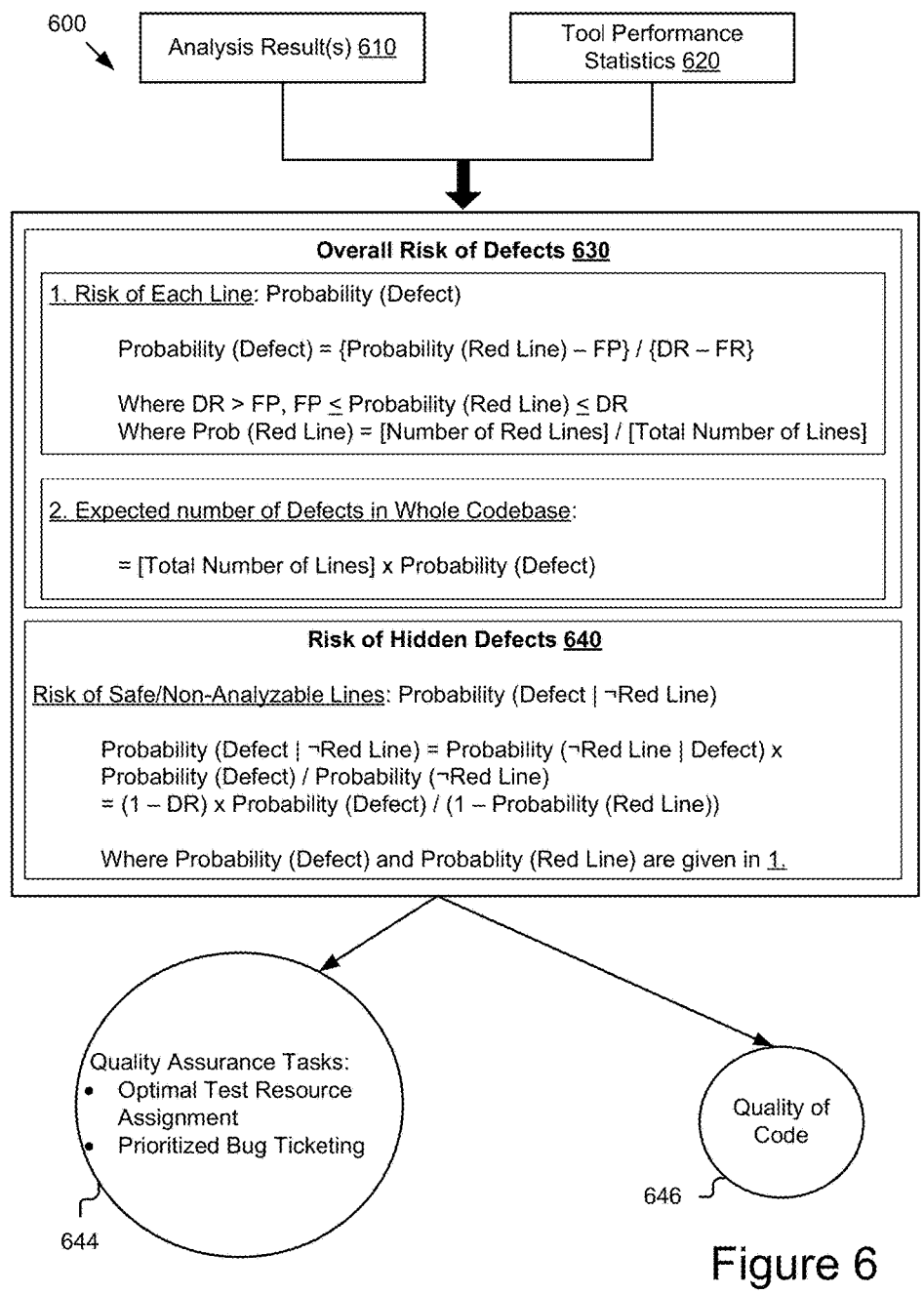
FIG. 6 is a graphical representation illustrating an example method for computing an overall risk of defects associated with an example codebase.

By way of a graphical illustration, FIG. 6 depicts an example method 600 for computing an overall risk of defects and risk of hidden defects associated with an example codebase. As depicted, the expectation module 206 may receive one or more analysis results 610 and tool performance statistics 620 associated with one or more analysis tools 117 to estimate the overall risk of defects 630 and the risk of hidden defects 640 in the software codebase. In some embodiments, an analysis result for an analysis tool 117 may indicate for each line in the codebase whether the line is a safe (i.e., fault-free), an un-safe (i.e., faulty), and/or a non-analyzable line as described elsewhere herein, although the output can vary in other cases while not departing from the scope of the present disclosure. In some embodiments, tool performance statistics for the analysis tool 117 may describe the tool's detection rate, false positive rate, etc., as described elsewhere herein.

In some embodiments, the expectation module 206 may estimate the overall risk of defects 630 in a two-step process as depicted in FIG. 6. In the first step, the expectation module 206 may compute a risk of a defect for each line of the codebase (e.g., a probability of a defect for each line of the codebase). In some embodiments, the probability of defect in the line may be calculated by using the following formula:

$$\text{Probability(Defect)} = \{\text{Probability(Red Line)} - FP\} / \{DR - FR\},$$

where DR>FP, FP≤Probability (Red Line)≤DR.

In the above formula, FP is the false positive rate for the analysis tool, DR is the detection rate for the analysis tool, Red Line indicates the line as faulty (e.g., defective, as having error, etc.), and the probability of red line is calculated based on the following formula:

$$\text{Probability(Red Line)} = [\text{Number of Red Lines}] / [\text{Total Number of Lines}].$$

In the second step, the expectation module 206 may compute an expected number of defects in the codebase (e.g., in the whole codebase) based on a total number of lines present in the codebase and the probability of a defect as estimated in the first step. In some embodiments, the expectation module 208 may compute the expected number of defects by simply taking a product (as shown below) of the total number of lines present in the codebase and the probability of a defect in each line as estimated in Step 1. For instance:

$$\text{Expected Number of Defects in Entire Codebase} = [\text{Total Number of Lines}] \times \text{Probability(Defect)}.$$

In some embodiments, the expectation module 206 may estimate the risk of hidden defects 640 based on the probability of defect, probability of red lines, and the detection rate, discussed above.

Estimating the risk of hidden defects 640 is advantageous because it may help to determine any faults that were not determined, skipped, and/or unable to be analyzed by one or more analysis tools 117 during another iteration. Estimating this risk further helps to determine whether the lines determined to be safe (fault-free) in the codebase by the analysis tools 117 are actually safe or not. In some embodiments, the expectation module 208 may compute the risk of defects in safe/non-analyzable lines by using the following formula:

$$\text{Probability(Defect} | \neg \text{Red Line)} = \text{Probability}(\neg \text{Red Line} | \text{Defect}) \times \text{Probability(Defect)} / \text{Probability}(\neg \text{Red Line}) = (1 - DR) \times \text{Probability(Defect)} / (1 - \text{Probability(Red Line)}).$$

In some embodiments, responsive to estimating the overall risk of defects 630 and/or the risk of hidden defects 640, the expectation module 206 may store them in a data store, such as the storage device 245, for access and retrieval by one or more components of the quality analysis application 109. For instance, the quality module 208 may retrieve the overall risk of defects 630 and/or the risk of hidden defects 640 to perform one or more quality assurance tasks 644 and/or determine an overall quality of the codebase 646 based thereon, and/or the interface module 210 may retrieve and include the risk calculations in summary provided to the user, etc. In some embodiments, the expectation module 206 may send the overall risk of defects 630 and/or the risk of hidden defects 640 to the interface module 210 for presentation to a user (e.g., alone or in conjunction with the results produced by other components). Presenting the overall defects 630 and/or the hidden defects 640 to the user is advantageous as the user may be able to realize the real/correct faults present in the codebase which were miscommunicated by the analysis module 202 before and then take corrective measures and/or actions to rectify the faults accordingly.

The quality module 208 can include software and/or hardware logic for performing quality assurance tasks on a software codebase based on expected number of defects found in the codebase. In some embodiments, the quality module 208 may perform a quality assurance task responsive to receiving expectation data from the expectation module 206, and then use that data to perform the task. In some embodiments, the quality module 208 may perform a quality assurance task based on an input and/or a request received from the interface module 210. For example, a user may request that one or more quality assurance tasks be performed on software, and the interface module 210 may receive and further route the request to the quality module 208 to process that request. The quality module 208 may provide a summary of the one or more quality assurance tasks performed by it to the interface module 210 for presentation to the user thereon. In some embodiments, the quality module 208 may store the summary of the quality assurance tasks in a data store, such as the storage device 245, for access and retrieval by one or more components of the quality analysis application 109.

In some embodiments, the quality module 208 may receive expectation data from the expectation module 206 and/or the storage 245, and may use the data to perform quality assurance tasks on software. As noted elsewhere herein, the expectation data may include a risks of defects and hidden defects in the codebase. The quality module 208 may use this data to reliably monitor the software quality while the software is being developed (in the implementation phase).

In some embodiments, the quality module 208 may determine software reliability growth for software based on the estimated number of faults. The software reliability growth may describe a cumulated number of faults detected in the software codebase as a function of time. In some embodiments, the quality module 208 may send the software reliability growth information to the interface module 210, which may then use the information to generate a software reliability growth curve as depicted, for example, in FIG. 10.

Figure 14:
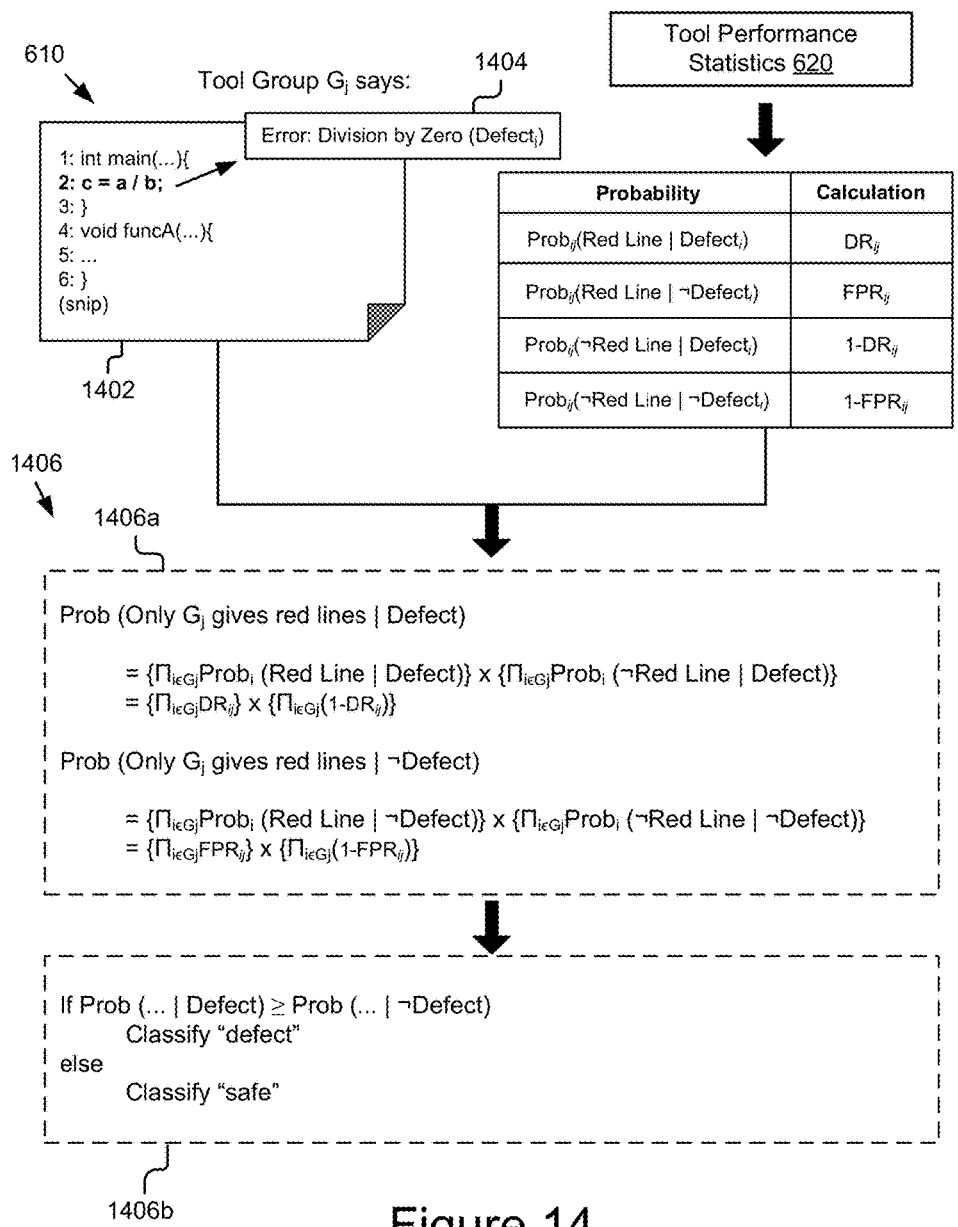
FIG. 14 is a graphical representation illustrating an example method for classifying an example line of codebase detected as having defect(s) into one of safe or defective line.

The classification module 209 can be software and/or logic for classifying faults into actual faults and false faults. The faults may include one or more faults identified by one or more of the analysis tools 117. For example as depicted in FIG. 14, a group $G_j$ of analysis tools 117 may indicate that line 2 of code snippet 1402 contains a division by zero fault 1404 in the analysis results 610 produced by the group. The faults identified by these analysis tools 117 may include false positives. The classification module 209 may classify one or more of the faults identified by the tools 117 as actual faults and false faults (falsely identified defects). This classification is advantageous as false positive results produced by one or more of the analysis tools 117 can be eliminated and more reliable results can be obtained, which further help in performing better quality assurance tasks.

In some embodiments, the classification module 209 may perform its classification based on analysis results and performance statistics data associated with the one or more analysis tools 117. For instance, the classification module 209 may be communicatively coupled to the analysis module 202 and the statistics module 204 to receive the analysis results and the performance statistics, respectively. In some embodiments, the classification module 209 may receive the analysis results and the performance statistics associated with the analysis tools 117 from the storage device 245 and the tool performance database 249, respectively. Other variations are also possible.

By way of illustration, FIG. 14 depicts an example method for classifying an example line of codebase 1402 identified by a group $G_j$ of analysis tools 117 as having a defect 1404 as being actually defective or safe. As depicted, the classification module 209 may receive one or more analysis results 610 and tool performance statistics 620 associated with one or more analysis tools of a tool group $G_j$ to perform the classification process 1406. As depicted, the analysis results 610 produced by the tool group $G_j$ indicate that line 2 contains a division by zero defect $Defect_j$ (labeled 1404). The tool performance statistics 620 for the tool Group $G_j$, which may include probabilities and defect rates for the various tools in the tool Group $G_j$, may be used by the classification module 209 to classify the potential defect 1404 into an actual defect or a false defect using a two-step process 1406.

In the first step 1406a, an aggregate detection rate or an aggregate probability of defect in defective line(s) (or red line(s)) identified by the tool group $G_j$ is computed. Also, an aggregate false positive rate or an aggregate probability of no defect in red line(s) identified by the tool group $G_j$ in the first step is computed. In some embodiments, the aggregate detection rate and the aggregate false positive rate may be computed by the expectation module 206. For instance, the classification module 209 may send a signal to the expectation module 206 to compute the aggregate detection rate and aggregate false positive rate based on the analysis result 610 and the tool performance statistics 620. In some embodiments, the expectation module 206 may compute the aggregate detection rate (e.g., probability of defect in red line(s)) and aggregate false positive rate (e.g., probability of no defect in the red line(s)) by using the following formula:

Probability ($G_j$-only tools giving red lines | Defect) =

$\{\Pi_{i \in G_j} Prob_i(\text{Red Line} | \text{Defect})\} \times \{\Pi_{i \in \bar{G}_j} Prob_i(\neg \text{Red Line} | \text{Defect})\} =$ $\{\Pi_{i \in G_j} DR_{ij}\} \times \{\Pi_{i \in \bar{G}_j} (1 - DR_{ij})\}$ And, Probability ($G_j$-only tools giving red lines | ¬ Defect) =

$\{\Pi_{i \in G_j} Prob_i(\text{Red Line} | \text{Defect})\} \times$ $\{\Pi_{i \in \bar{G}_j} Prob_i(\neg \text{Red Line} | \neg \text{Defect})\} =$ $\{\Pi_{i \in G_j} FPR_{ij}\} \times \{\Pi_{i \in \bar{G}_j} (1 - FPR_{ij})\}$ In the above formula, $G_j$ includes the set of tools that produced red lines and does not include tools that produced no red lines. Once the aggregate probabilities are computed, the expectation module 206 may send these probabilities to the classification module 209 to perform its classification process in the second step 1406b. In the second step 1406b, the classification module 209 may classify defect 1404 as an actual defect or as safe (not a defect). As depicted, the classification module 209 may perform its classification in the second step 1406b by comparing the aggregate probabilities computed in the first step 1406a. For instance, the classification module 209 may compare the aggregate probability (aggregate detection rate) of a red line actually including a defect with the aggregate probability (aggregate false positive rate) of a red line not actually including a defect to determine whether the aggregate detection rate is greater than or equal to the aggregate false positive rate. If the aggregate detection rate is greater than or equal to the aggregate false positive rate, the classification module 209 may classify the defect 1404 as an actual defect. If not, then the classification module 209 may classify the defect 1404 as an actual defect as safe (not a defect, a false defect, etc.).

In some embodiments, responsive to classifying the one or more of the defects into actual or false defects, the classification module 206 may store results of its classification in a data store, such as the storage device 245, for access and retrieval by one or more components of the quality analysis application 109. For instance, the quality module 208 may retrieve classification results to perform one or more quality assurance tasks. In some embodiments, the classification module 209 may send the classification results to the interface module 210 for presentation to a user.

The interface module 210 can include software and/or hardware logic for receiving, interpreting, and routing requests, and providing results. Example requests may include, but are not limited to, analysis-related requests, statistics-related requests, overall-fault estimation-related requests, quality-related requests, classification-related requests, etc. Analysis-related requests may include requests to perform fault analysis on the source codebase of a software application (e.g., software application 103a), generate summaries based on the analysis, etc. Statistics-related requests may include detection-rate requests for calculating detection rates for analysis tools 117, false-positive requests for calculating false-positive rates for the analysis tools 117, complement values to the detection rates, false positive rates, etc. Overall-fault estimation-related requests may include requests for estimating an expected number of faults in an entire codebase, hidden-defects requests for estimating a probability of hidden defects in a codebase, etc. Quality-related requests may include quality-assurance requests for performing quality assurance tasks based on the expected number of defects found in the entire codebase, etc. Classification-related requests may include requests for classifying one or more (e.g., potential) faults into actual or false faults, etc.

The interface module 210 can interpret the requests received for the quality analysis application 109 and route the requests to the appropriate component. For instance, the interface module 210 can route analysis-related requests to the analysis module 202, statistics-related requests to the statistics module 204, overall-fault-estimation requests to the expectation module 206, quality-related requests to the quality module 208, and classification-related requests to the classification module 209. In some embodiments, the interface module 210 may include a single or disparate modules to perform the various acts and/or functionality provided by it. In some embodiments, various acts and/or functionality of the interface module 210 may be included in the other components of the quality analysis application 109. Other variations are also possible.

In some embodiments, the interface module 210 may cooperate with the analysis module 202, the statistics module 204, the expectation module 206, the quality module 208, and/or the classification module 209 to generate a comprehensive summary summarizing different results that are produced by one or typically more of these modules 202, 204, 206, 208, and/or 209. In some embodiments, the interface module 210 may format the different results into a suitable format for presentation to a user via a dashboard. For example, the dashboard can provide the user with detailed information about various types of defects that were found by analysis tools 117 in a software codebase, number of defects that were actually classified as defects during fault classification, analysis tools that correctly identified the defects, number and type of hidden defects that were found during overall fault estimation, overall probability of defects in the software codebase, false positives or false alarms that were raised during analysis, analysis tools that raised those false positives or false alarms, analysis tools with the best detection rates, analysis tools with the worst detection rates, analysis tools with least false positive rates, analysis tools with the highest false positive, software reliability growth information based on estimated number of faults found in the software codebase, overall quality of the software based on the overall fault estimation, etc.

In some embodiments, the dashboard can also provide the user with cascading levels of detail that he or she can easily drill down into to view the data in more granular segments. For instance, the comprehensive summary as described above can be segmented with respect to the analysis module 202, the statistics module 204, the expectation module 206, the quality module 208, and/or the classification module 209. By way of example, the dashboard can allow a user to view fault analysis summary of the software produced by the analysis module 202, tool performance statistics summary produced by the statistics module 204, overall defects and hidden defects summary produced by the expectation module 206, one or more quality assurance tasks performed by the quality module 208, classification summary produced by the classification module 209, etc. In some embodiments, the dashboard may present these summaries in the form of graphs, tables, data, descriptions, etc.

The interface module 210 may format the results into a suitable format for presentation to the user. For instance, the interface module 210 can generate presentational data for providing a user interface to a user that incorporates the results produced by the analysis module 202, the statistics module 204, the expectation module 206, the quality module 208, and/or the classification module 209. In another example, the interface module 210 can convert the results into a certain format (e.g., XML, JSON, HTML, PDF, etc.) and provide the results to the user. The results may be provided natively (by the quality analysis application 109 or via another application operable by the computing device being used by the user 125, such as a web browser, an office application, portable document viewer, text editor, IDE, etc.

In some embodiments, the interface module 210 can generate graphical data for providing a user interface to a user. For example, the interface module 210 may generate the graphical data as depicted in FIGS. 10-13 which may be provided to the user for display on the user's client device 135, the computing system 101, etc. In some embodiments, the interface module 210 can send the graphical data to a display device (not shown) coupled to the computing system 101, causing the display device to present the user interface to the user. In some embodiments, the user can access the computing system 101 remotely. The interface module 210 can send the graphical data to the client device 135 via the network 105, causing the client device 135 to present the user interface to the user on a display device coupled to the client device 135 (e.g., via a native application and/or a web browser). It should be understood that the interface module 210 may generate graphical data for providing other user interfaces to users.

Methods

Figure 3:
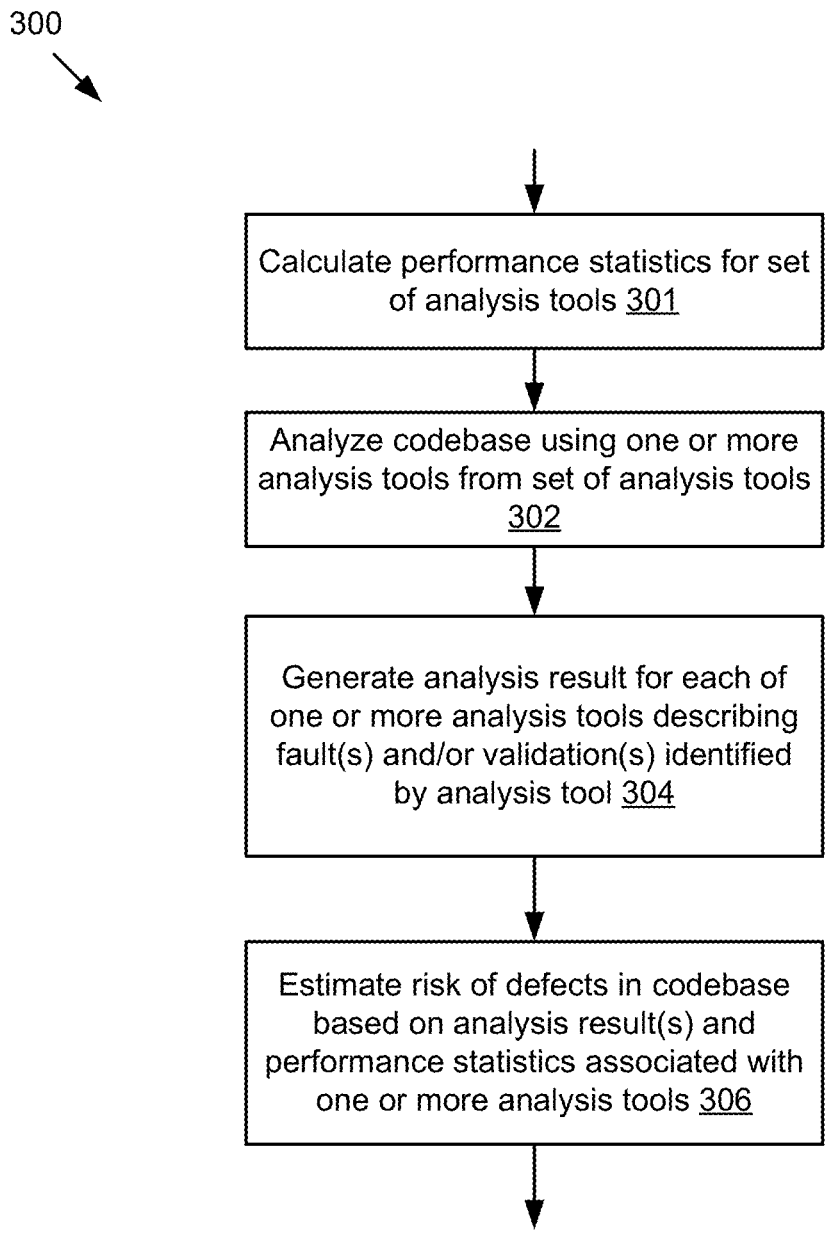
FIG. 3 is a flowchart of an example method for estimating the risk of defects in a codebase based on analysis results and performance statistics associated with a set of analysis tools.

FIG. 3 is a flowchart of an example method 300 for estimating the risk of defects in a codebase based on analysis results and performance statistics associated with a set of analysis tools. The statistics module 204 may calculate 301 performance statistics for a set of analysis tools 117. In some embodiments, the performance statistics may include a detection rate and/or a false positive rate for each analysis tool of the set as described elsewhere herein. An example method 301 for determining the performance statistics is illustrated with reference to at least FIGS. 8 and 9. The analysis module 202 may analyze 302 a software codebase using the one or more analysis tools from the set of analysis tools 117. In some embodiments, the software codebase may include one or more lines of code and/or code modules 107.

The method 300 may generate 304 an analysis result for each of the one or more analysis tools 117. In some embodiments, the analysis results are produced by the analysis tools 117 and provided to the analysis module 202, as discussed in further detail elsewhere herein. The analysis result may describe one or more faults and/or one or more validations identified by the analysis tool 117. The expectation module 206 may estimate 306 a risk of defects in the codebase based on one or more analysis results and the performance statistics associated with the one or more analysis tools of the set. In some embodiments, the risk of defects estimated in block 306 may indicate an expectation of the actual number of defects present in the entire codebase and/or a risk of any hidden defects in the codebase, as described elsewhere herein.

Figure 4A:
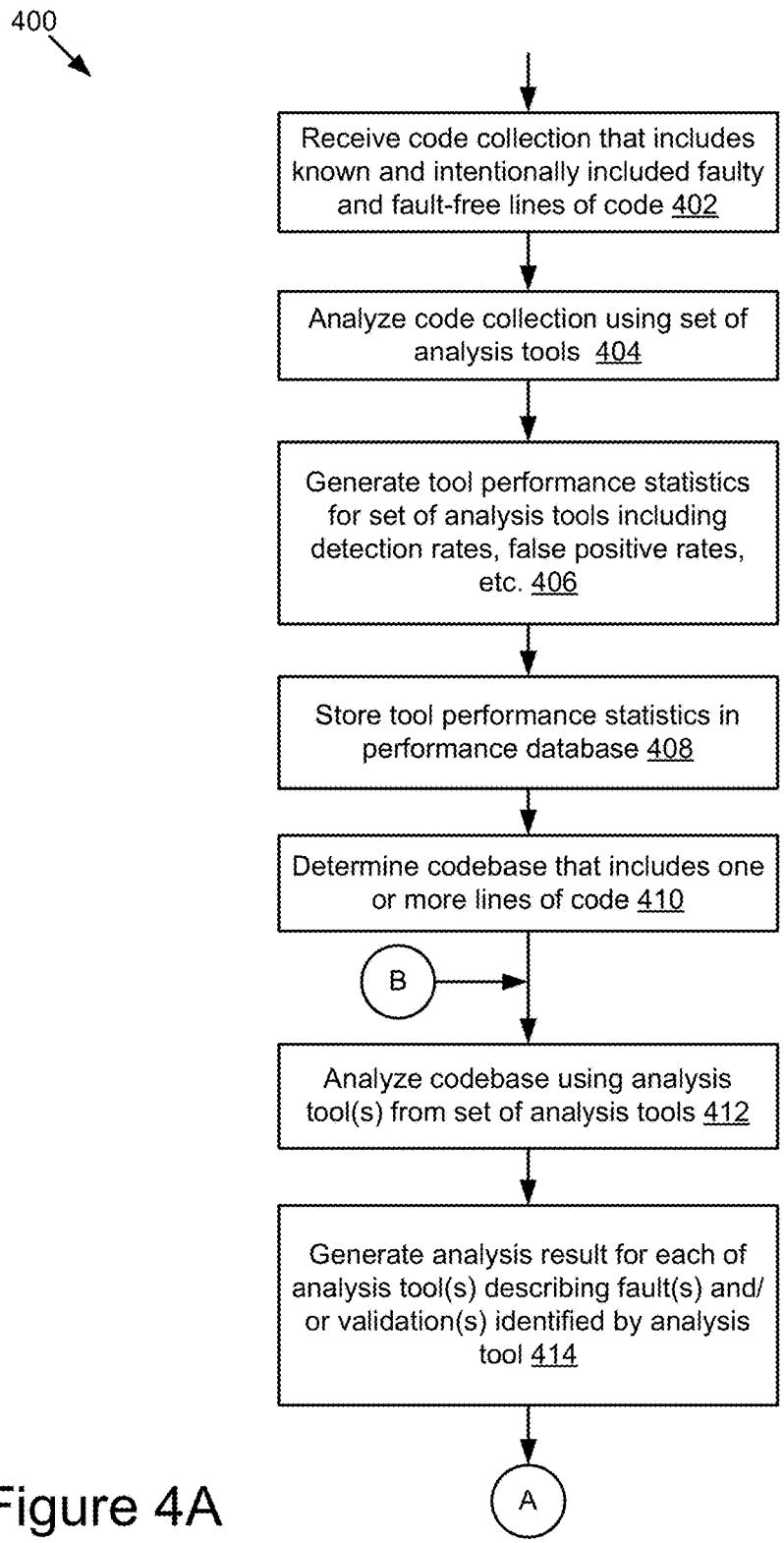
FIGS. 4A-4B is a flowchart of an example method for estimating the risk of defects in a codebase based on analysis results and performance statistics associated with a set of analysis tools.
Figure 4B:
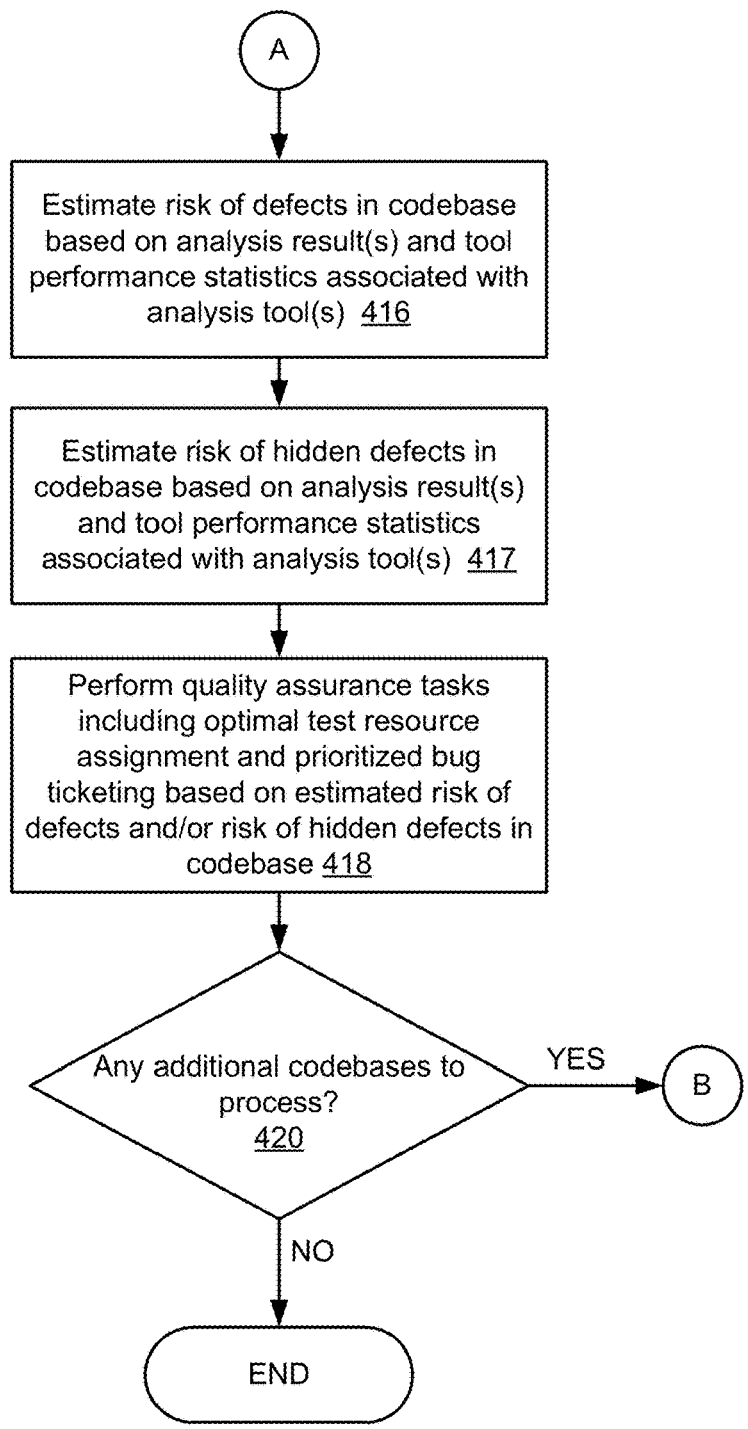

FIGS. 4A-4B is a flowchart of an example method 400 for estimating risk of defects in a codebase based on analysis results and performance statistics associated with a set of analysis tools. Referring to FIG. 4A, the analysis module 202 may receive 402 a code collection that includes known and intentionally included faulty and fault-free lines of code and analyze 404 the code collection using a set of analysis tools 117. In some embodiments, the code collection may be prepared and provided/sent by the statistics module 204 to the analysis module 202 for analysis, as described elsewhere herein. The statistics module 204 may receive results of the analysis performed in block 404 and use them to generate 406 tool performance statistics for the set of analysis tools 117. The statistics module 204 may then store 408 the tool performance statistics for each analysis tool of the set in the tool performance database 249 for access and retrieval by one or more components of the quality analysis application 109. The expectation module 206 may receive the tool performance statistics from the statistics module 204 or the tool performance database 249 and use them to carry out the acts and/or functionalities provided by it, as described elsewhere herein.

The analysis module 202 may determine 410 a codebase that includes one or more lines of code and analyze 412 the codebase using one or more analysis tools from the set of analysis tools 117. Each analysis tool 117 may generate 414 an analysis result describing one or more faults and/or one or more validations identified by the analysis tool 117 as described elsewhere herein. In some embodiments, the analysis module 202 may receive and store one or more analysis results associated with the one or more analysis tools 117 in a data store (e.g., the storage 245) for use and retrieval by one or more components of the quality analysis application 109. In some embodiments, the analysis module 202 may send the one or more analysis results to the expectation module 206, which may then use the results to perform its acts and/or functionalities as described elsewhere herein.

The expectation module 206 may then estimate 416 the risk of defects in the codebase and 417 the risk of hidden defects in the codebase based on the one or more analysis results and the tool performance statistics associated with the one or more analysis tools 117. In some embodiments, the expectation module 206 may retrieve the one or more analysis results and the tool performance statistics from the storage 245 and the tool performance database 249, respectively, to perform the operations 416 and 417. In some embodiments, the expectation module 206 may receive the one or more analysis results and the tool performance statistics from the analysis module 202 and the statistics module 204 directly as described elsewhere herein. An example method for estimating the risk of defects and/or the risk of hidden defects in the codebase is illustrated with reference to at least FIG. 6.

Once the risk of defects and/or the risk of hidden defects in the codebase are estimated, the quality module 208 may perform 418 quality assurance tasks including, for example, an optimal test resource assignment, a prioritized bug ticketing, etc. In block 420, a determination is made as whether to process any additional codebases. If the result of the determination is affirmative, then the method 400 may return to block 412 to perform another codebase analysis and related operations. Otherwise, the method 400 may end, reiterate various operations, proceed to other operations, etc.

Figure 5:
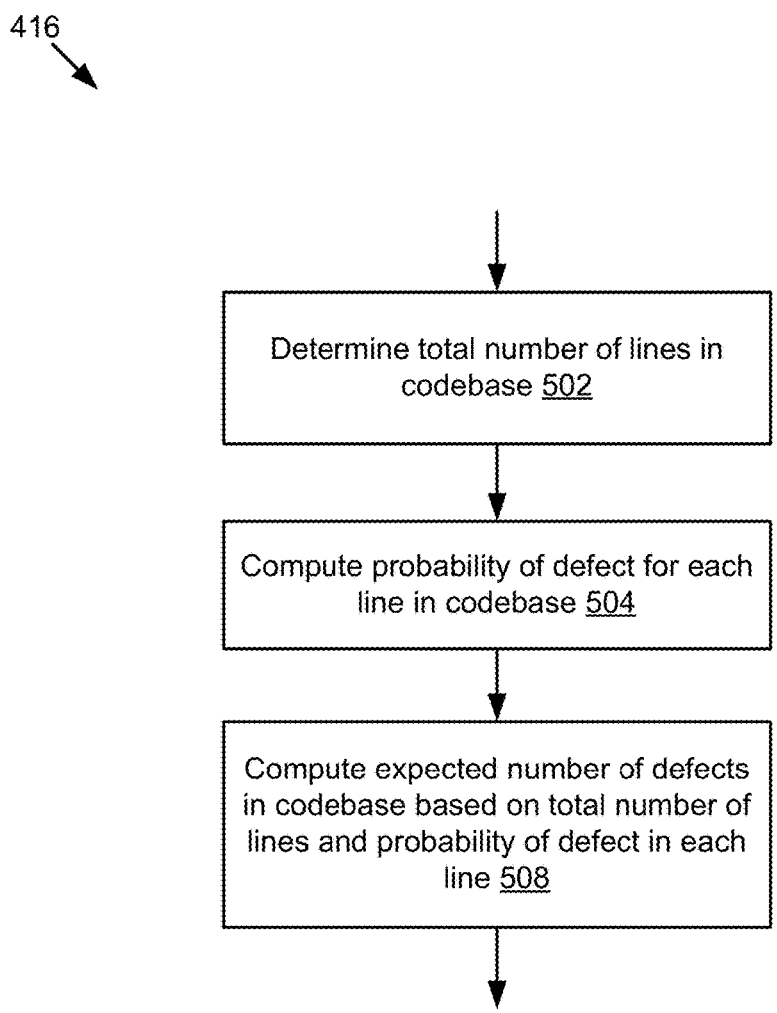
FIG. 5 is a flowchart of an example method for estimating an overall risk of defects in an example codebase.

FIG. 5 is a flowchart of an example method 416 for estimating overall risk of defects in an example codebase. The expectation module 206 may determine 502 a total number of lines present in the codebase. The expectation module 206 may compute 504 a probability of defect for each line in the codebase. In some embodiments, the expectation module 206 may compute the probability of defect using the formula depicted in step 1 of 630 in FIG. 6. Once the probability of defect for each line in the codebase is computed, the expectation module 206 may then compute 508 an expected number of defects in the codebase based on the total number of lines and the probability of a defect in each line. In some embodiments, the expectation module 206 may compute the expected number of defects using the formula depicted in step 2 of 630 in FIG. 6. The expected number of defects may indicate an estimate of the overall risk of defects present in the entire codebase.

Figure 9:
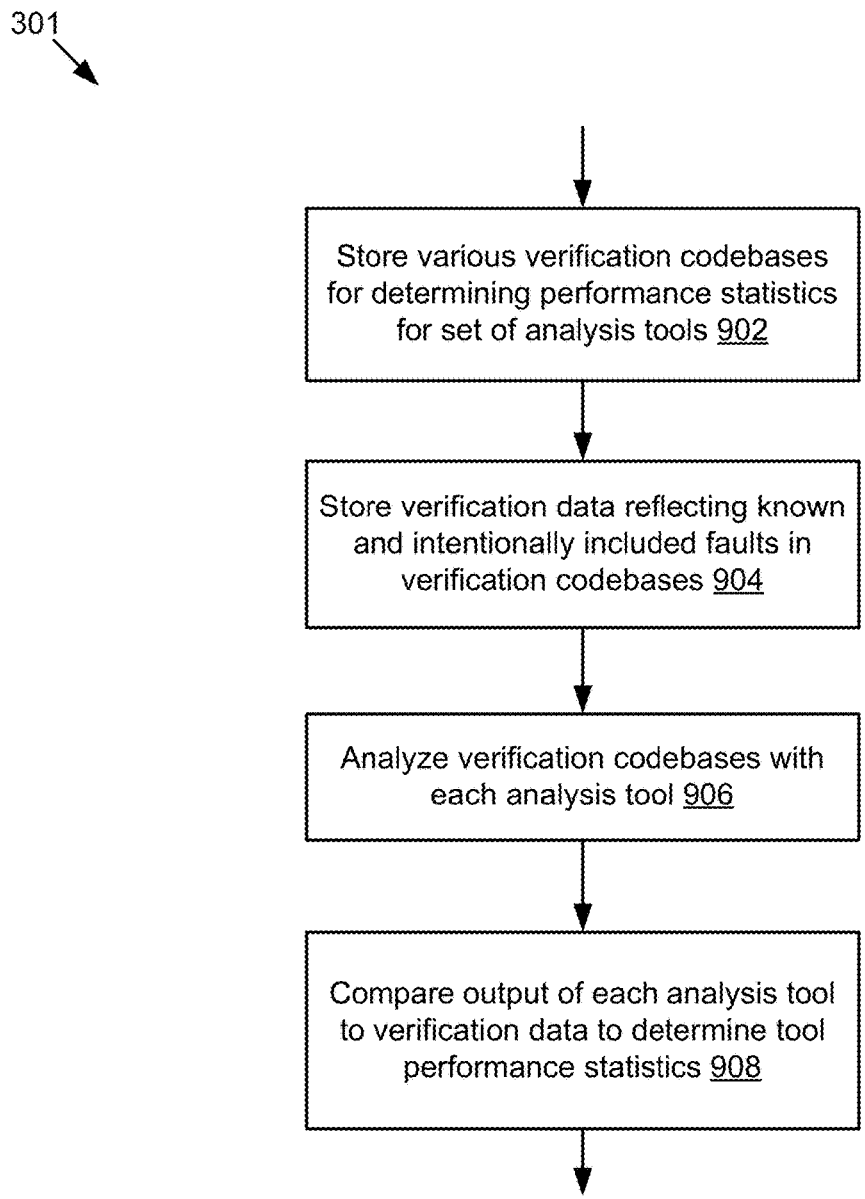
FIG. 9 is a flowchart of an example method for determining performance statistics for a set of analysis tools.

FIG. 9 is a flowchart of an example method 301 for determining performance statistics for a set of analysis tools 117. In block 902, the statistics module 204 may store various verification codebases in a data store (e.g., the code database 247). As discussed elsewhere herein, the verification codebases are curated specifically for determining performance statistics for the set of analysis tools 117. For instance, these software codebases intentionally include specific faults whose locations and characteristics are known and reflected by corresponding verification data. In block 904, the statistics module 204 may store the verification data reflecting the known and intentionally included faults included in the verification codebases in a data store, such as the code database 247. The statistics module 204 may send a signal to the analysis tool 202 to analyze using one or more analysis tools 117 the software codebases including the verification data. In block 906, the analysis module 202 facilitate analysis of the software codebases by each analysis tool 117. In some embodiments, the analysis module 202 may store the results produced by the tools in a data store (data store 245) for retrieval by the statistics module 204 and/or and send the analysis results to the statistics module 204. In block 908, the statistics module 204 may compare the analysis results of each analysis tool 117 to the verification data to determine tool performance statistics for that tool. Tool performance statistics may include, but are not limited to, a false positive rate, a detection rate, etc., as discussed in further detail elsewhere herein. In some embodiments, the statistics module 204 may store the tool performance statistics for each of the analysis tools in the tool performance database 249 for use and retrieval by one or more components of the quality analysis application 109 or may provide the data directly to those components.

Figure 15:
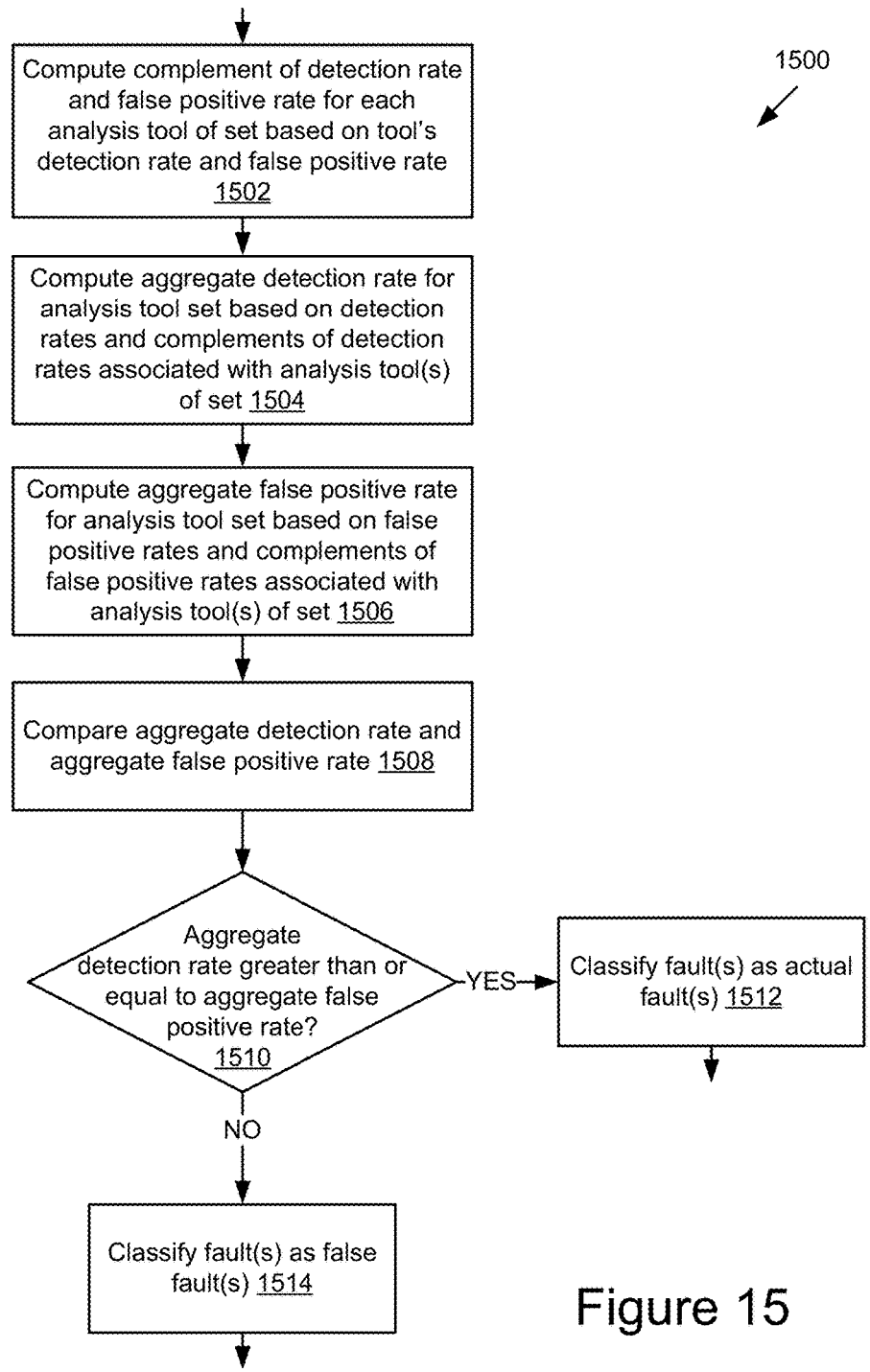
FIG. 15 is a flowchart of an example method for classifying fault(s) into actual fault(s) or false fault(s) based on performance statistics associated with a set of analysis tools.

FIG. 15 is a flowchart of an example method 1500 for classifying fault(s) into actual fault(s) or false fault(s) based on performance statistics associated with a set of analysis tools. In some embodiments, the method 1500 can be used to facilitate estimating the risk of defects in codebase based on analysis result(s) and performance statistics associated with one or more analysis tools, as discussed above with reference to at least FIG. 3. To facilitate estimating the risk of defects, the method 1500 may, in some embodiments, classify fault(s) into actual fault(s) or false fault(s) based on performance statistics associated with one or more analysis tools. In particular, the statistics module 204 may compute 1502 a complement of detection rate and false positive rate for each analysis tool of the set based on the tool's detection rate and false positive rate. In some embodiments, the statistics module 204 may access the tool performance database 249 for retrieving the tool performance statistics including the detection rate and false positive rate for each analysis tool stored therein (e.g., as described in FIGS. 4A-4B) and then use those statistics to compute their complement rates for the tool. In some embodiments, the statistics module 204 may store the complement rate of the detection rate and false positive rate for each analysis tool in the tool performance database 249 for access and retrieval by one or more components of the quality analysis application 109.

The expectation module 206 may compute 1504 an aggregate detection rate (or probability of defect in defective line(s)) for the analysis tool set based on detection rates and complements of the detection rates associated with the one or more analysis tools of the set. The expectation module 206 may compute 1506 an aggregate false positive rate (or probability of no defect in defective line(s)) for the analysis tool set based on false positive rates and complements of the false positive rates associated with the one or more analysis tools of the set. Once the aggregate detection rate and aggregate false positive rate are computed, the expectation module 206 may send the aggregate rates to the classification module 209 to perform its respective operations. In some embodiments, the expectation module 206 may store aggregate detection rate and aggregate false positive rate computed by it for a tool set in the tool performance database 249 for access and retrieval by one or more components of the quality analysis application 109.

The classification module 209 may compare 1508 the aggregate detection rate with the aggregate false positive rate to determine in block 1510 whether the aggregate detection rate is greater than or equal to the aggregate false positive rate. If the result of the determination in block 1510 is affirmative, the classification module 209 may classify the one or more faults (e.g., as generated in analysis result 304 in FIG. 3) as actual fault(s). On the other hand, if the result of the determination in block 1510 is negative, then the classification module 209 may classify the one or more faults as false fault(s) or false alarm(s).

Graphic Representations

Figure 10:
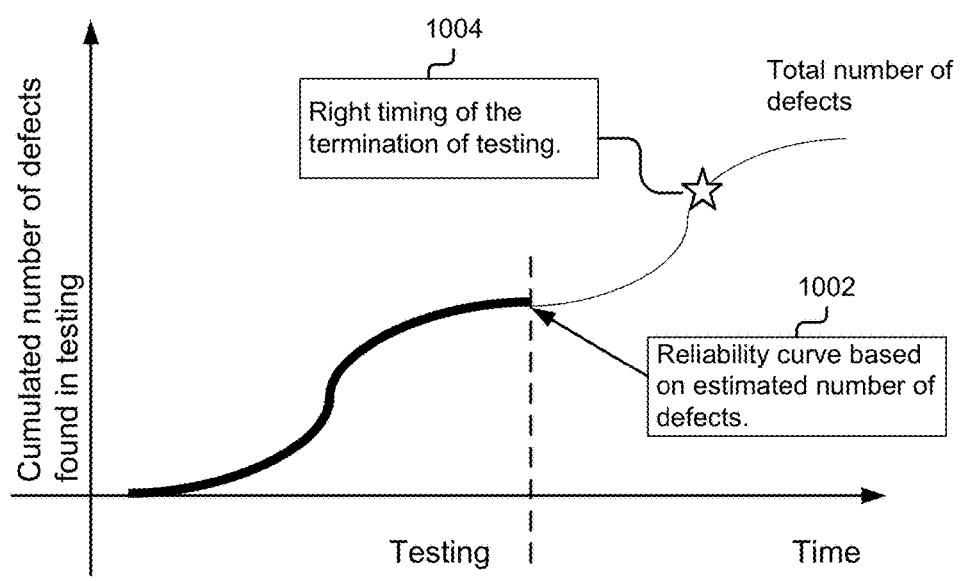
FIG. 10 is a graphical representation depicting an example reliability curve based on a cumulated number of defects found during an example software test.
Figure 11:
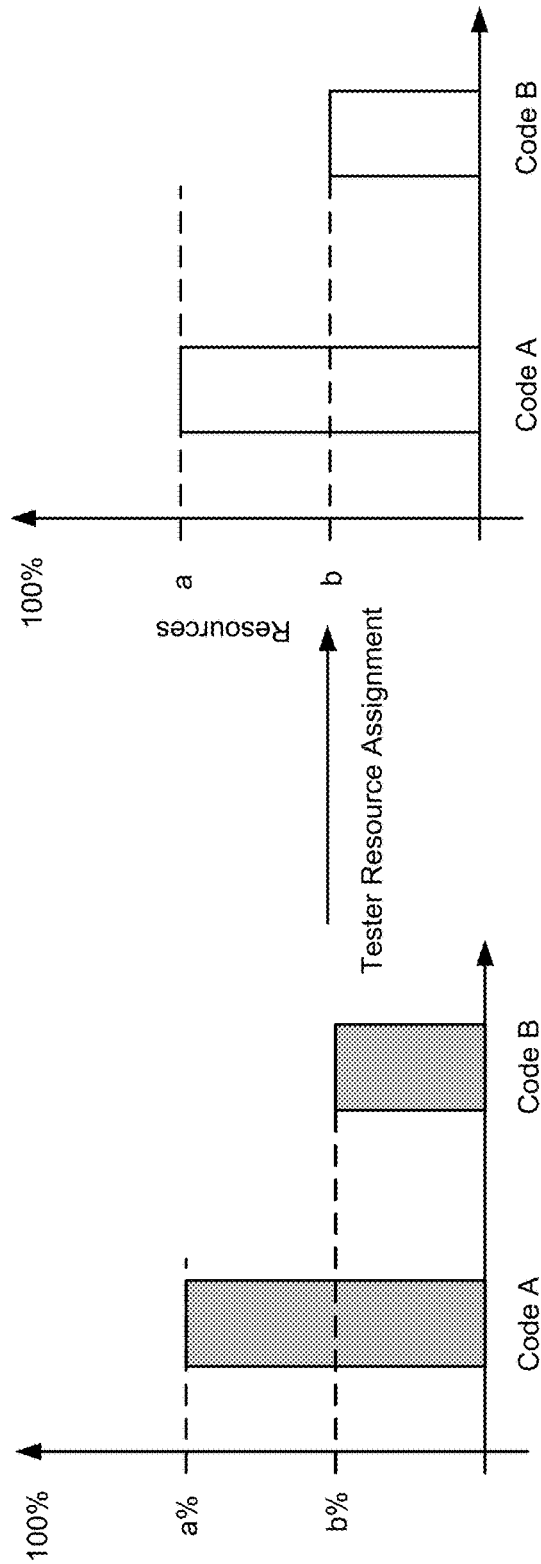
FIGS. 11A and 11B are graphical representations representing a risk of hidden defects associated with two example source codes and resource allocation to these source codes based on the risk of hidden defects associated with each source code.

FIG. 10 is a graphical representation depicting an example reliability curve based on a cumulated number of defects found during an example software test. As depicted, the reliability curve 1002 represents an estimated number of defects that are estimated to have occurred during a software test in a particular period of time. The star symbol 1004 on the curve indicates a termination of the software test. The termination point coincides with a point in time when the estimated number of defects meets a certain threshold. For example, the test may be terminated when the estimated number of defects reaches 20. In some embodiments, the reliability curve 1002 may be generated by the interface module 210 as described elsewhere herein.

FIGS. 11A and 11B are graphical representations representing a risk of hidden defects associated with two example source codes and resource allocation to these source codes based on the risk of hidden defects associated with each code. In particular, FIG. 11A represents a risk of hidden defects associated with a source code A and a source code B. As depicted, the code A has a risk of hidden defects of a % and the code B has a risk of hidden defects of b %. In some embodiments, the expectation module 206 may estimate the risk of hidden defects for each code, as discussed in further detail elsewhere herein.

In some embodiments, the expectation module 206 may send the risk of hidden defects estimates to the quality module 208, which may then use these estimates to optimally assign various resources to the source codes A and B for performing quality assurance on these codes as depicted in FIG. 11B. As depicted, more resources (e.g., number of testers and/or developers, development time, processing time and/or resources, etc.) are assigned to the code A than code B because of a larger risk of hidden defects being present in the code A. In some embodiments, a user (e.g., a software tester) may be able to manually assign these resources to the codes A and B, respectively.

Figure 12:
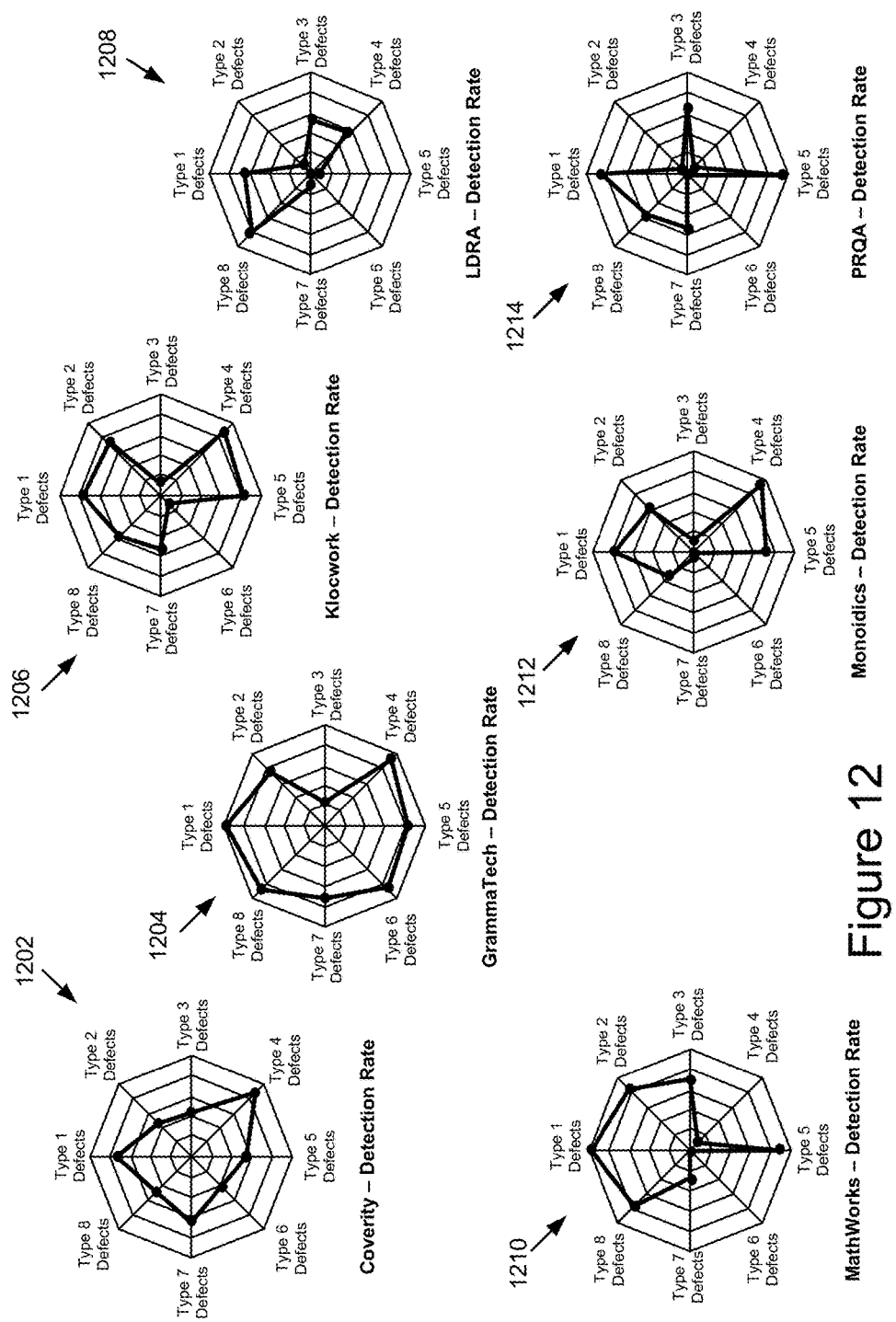
FIG. 12 depicts a set of spider charts representing detection rates for different analysis tools by different defect types.

FIG. 12 depicts a set of spider charts 1202-1214 representing detection rates for different analysis tools by different defect types. In particular, chart 1202 represents detection rate of Coverity analysis tool for each of defect types 1-8, chart 1204 represents detection rate of GrammaTech analysis tool for each of the defect types 1-8, chart 1206 represents detection rate of Klocwork analysis tool for each of the defect types 1-8, chart 1208 represents detection rate of LDRA analysis tool for each of the defect types 1-8, chart 1210 represents detection rate of MathWorks analysis tool for each of the defect types 1-8, chart 1212 represents detection rate of Monoidics analysis tool for each of the defect types 1-8, and chart 1214 represents detection rate of PRQA analysis tool for each of the defect types 1-8. In some embodiments, the defect types 1-8 may include, but are not limited to, static memory defects, dynamic memory defects, resource management defects, pointer-related defects, concurrency defects, inappropriate code defects, miscellaneous defects, etc.

As seen from the charts 1202-1214 in numerical order, Coverity analysis tool has a good detection rate for type 4 defects but average detection rates for other defect types. GrammaTech analysis tool has the best detection rates for type 1 and 4 defects; good detection rates for type 2 and 5-8 defects, and a low detection rate for type 3 defects. Klocwork analysis tool has good detection rates for type 4 and 5 defects; average detection rates for type 1, 2, 7, and 8 defects; and very low detection rates for type 3 and 6 defects. LDRA analysis tool has a good detection rate for type 8 defects; average detection rates for type 1, 3, and 4 defects; very low detection rates for type 2, 5, and 7 defects; and almost a nil detection rate for type 6 defects. MathWorks analysis tool has a best detection rate for type 1 defects; good detection rates for type 2, 3, 5, and 8 defects; low detection rates for type 4 and 7 defects; and almost a nil detection rate for type 6 defects. Monoidics analysis tool has a best detection rate for type 4 defects; good detection rates for type 1 and 5 defects; average detection rates for type 2 and 8 defects; very low detection rates for type 3 defects; and almost a nil detection rate for type 6 and 7 defects. PRQA analysis tool has a best detection rate for type 5 defects; good detection rates for type 1 and 3 defects; average detection rates for type 7 and 8 defects; very low detection rates for type 2 and 4 defects; and almost a nil detection rate for type 6 defects.

Figure 13:
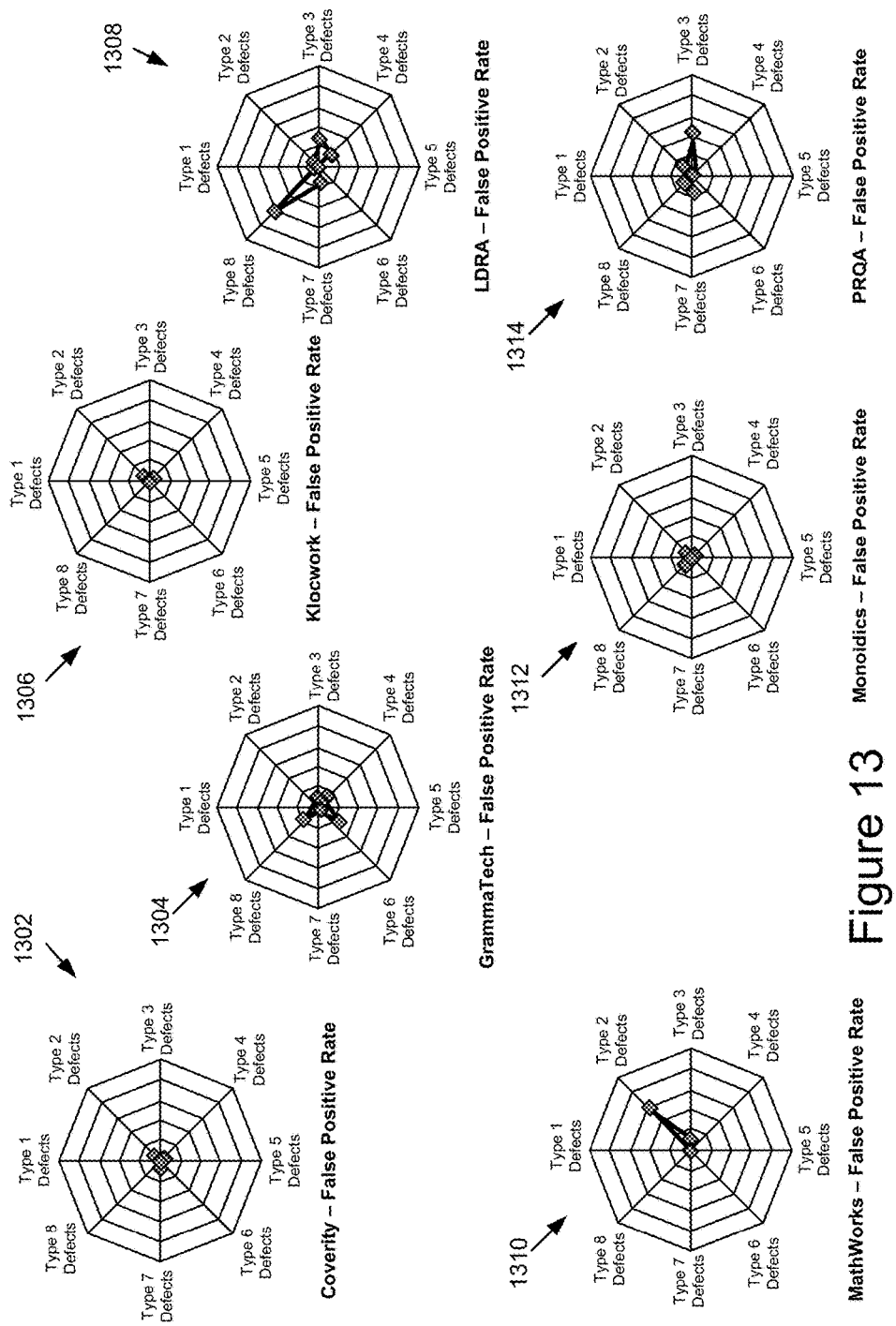
FIG. 13 depicts a set of spider charts representing false positive rates for different analysis tools by different defect types.

FIG. 13 depicts a set of spider charts 1302-1314 representing false positive rates for different analysis tools by different defect types. In particular, chart 1302 represents false positive rate of Coverity analysis tool for each of defect types 1-8, chart 1304 represents false positive rate of GrammaTech analysis tool for each of the defect types 1-8, chart 1306 represents false positive rate of Klocwork analysis tool for each of the defect types 1-8, chart 1308 represents false positive rate of LDRA analysis tool for each of the defect types 1-8, chart 1310 represents false positive rate of MathWorks analysis tool for each of the defect types 1-8, chart 1312 represents false positive rate of Monoidics analysis tool for each of the defect types 1-8, and chart 1314 represents false positive rate of PRQA analysis tool for each of the defect types 1-8. In some embodiments, lower the false positive rate of a given analysis tool, higher the confidence in the analysis tool that none or least number of false positives will be produced by the tool. While across the board the rates depicted by the charts 1302-1314 are relatively low, the existence of any false positive defects in analysis results produced by these tools can lead to substantial investigation and rework time by developers in order to vet all of the defects. In addition, each tool is unique in the types of defects that it may identify false positives for as shown in FIG. 13. Thus, cross-referencing results from a plurality of these tools in association with the methods discussed herein can mitigate the number of false positive defects from the testing results, and provide a more accurate depiction of the true state of the codebase being tested.

In the above description, for purposes of explanation, numerous specific details are set forth in order to provide a thorough understanding of the specification. It should be understood, however, that the disclosure can be practiced without these specific details. In some embodiments, structures and devices are shown in block diagram form in order to avoid obscuring the description. For example, various embodiments are described primarily with reference to user interfaces and particular hardware. However, the embodiments apply to any type of computing device that can receive data and commands, and any peripheral devices providing services.

Reference in the specification to "an embodiment" or "some embodiments" means that a particular feature, structure, or characteristic described in connection with the embodiment(s) is included in at least one embodiment of the description. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The specification can take the form of an entirely hardware embodiment, an entirely software embodiment or an embodiment containing both hardware and software elements. In a preferred embodiment, the specification is implemented in software, which includes but is not limited to firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks.

Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats. Furthermore, as will be apparent to one of ordinary skill in the relevant art, the modules, routines, features, attributes, methodologies and other aspects of the disclosure can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A computer-implemented method comprising:
    storing, using one or more computing devices, verification data in a first codebase, the verification data indicating known and intentionally included faults in the first codebase;
    calculating, using the one or more computing devices, verified performance statistics for a set of analysis tools using the verification data indicating the known and intentionally included faults in the first codebase, the verified performance statistics including one or more of a verified defect detection rate, a verified false positive defect detection rate, a complement of the verified defect detection rate, and a complement of the verified false positive defect detection rate for each analysis tool in the set;
    after calculating the verified performance statistics for the set of analysis tools using the verification data indicating the known and intentionally included faults in the first codebase, analyzing, using the one or more computing devices, a second codebase using one or more analysis tools from the set of analysis tools, the second codebase being distinct from the first codebase;
    generating, using the one or more computing devices, an analysis result for the second codebase for each analysis tool of the one or more analysis tools, the analysis result describing one or more faults and one or more validations identified by the corresponding analysis tool for the second codebase;
    computing, using the one or more computing devices, a probability of defects in a line of code of the second codebase based on the analysis result generated by each of the one or more analysis tools and one or more of the verified defect detection rate, the verified false positive defect detection rate, the complement of the verified defect detection rate, and the complement of the verified false positive defect detection rate associated with each of the one or more analysis tools;
    estimating, using the one or more computing devices, a risk of defects in the second codebase proportional to the probability of defects in the line of code of the second codebase; and
    allocating, using the one or more computing devices, an amount of resources for performing a quality assurance task on the second codebase based on the risk of defects estimated in the second codebase.

2. The computer-implemented method of claim 1, wherein calculating the verified performance statistics for the set of analysis tools includes:
    analyzing, using the one or more computing devices, the first codebase with each analysis tool of the set; and
    comparing, using the one or more computing devices, an output of each analysis tool of the set to the verification data indicating the known and intentionally included faults in the first codebase to determine the verified performance statistics of the analysis tool.

3. The computer-implemented method of claim 1, wherein estimating the risk of defects in the second codebase includes:
    determining, using the one or more computing devices, a total number of lines in the second codebase; and
    computing, using the one or more computing devices, an expected number of defects in the second codebase based on the total number of lines in the second codebase and the probability of defects in the line of code of the second codebase.

4. The computer-implemented method of claim 1, further comprising:
    estimating, using the one or more computing devices, a risk of hidden defects in the second codebase based on the analysis result generated by each of the one or more analysis tools and one or more of the verified defect detection rate, the verified false positive defect detection rate, the complement of the verified defect detection rate, and the complement of the verified false positive defect detection rate associated with each of the one or more analysis tools, wherein the risk of hidden defects describes one or more lines of the second codebase as having defects that were determined to be defect-free or non-analyzable by the one or more analysis tools.

5. The computer-implemented method of claim 1, further comprising:
    performing, using the one or more computing devices, the quality assurance task on the second codebase.

6. The computer-implemented method of claim 1, wherein the verified defect detection rate is a rate of detecting actual faults in the first codebase and the verified false positive defect detection rate is a rate of detecting nonexistent faults in the first codebase.

7. The computer-implemented method of claim 1, wherein the quality assurance task includes an optimal resource assignment or a prioritized bug ticketing.

8. The computer-implemented method of claim 1, wherein estimating the risk of defects in the second codebase further includes:
classifying, using the one or more computing devices, the one or more faults into actual faults or false faults based on one or more of the verified defect detection rate, the verified false positive defect detection rate, the complement of the verified defect detection rate, and the complement of the verified false positive defect detection rate associated with the one or more analysis tools of the set.

9. The computer-implemented method of claim 8, wherein classifying the one or more faults into actual faults or false faults includes:
computing, using the one or more computing devices, an aggregate probability of defect in one or more lines of the second codebase based on one or more of the verified defect detection rate, the verified false positive defect detection rate, the complement of the verified defect detection rate, and the complement of the verified false positive defect detection rate associated with the one or more analysis tools of the set;
computing, using the one or more computing devices, an aggregate probability of no defect in the one or more lines of the second codebase based on one or more of the verified defect detection rate, the verified false positive defect detection rate, the complement of the verified defect detection rate, and the complement of the verified false positive defect detection rate associated with the one or more analysis tools of the set; and
comparing, using the one or more computing devices, the aggregate probability of defect and the aggregate probability of no defect to classify the one or more faults into the actual faults or the false faults.

10. A computer program product comprising a non-transitory computer-readable medium storing a computer-readable program, wherein the computer-readable program, when executed on one or more computing devices, causes the one or more computing devices to:
store verification data in a first codebase, the verification data indicating known and intentionally included faults in the first codebase;
calculate verified performance statistics for a set of analysis tools using the verification data indicating the known and intentionally included faults in the first codebase, the verified performance statistics including one or more of a verified defect detection rate, a verified false positive defect detection rate, a complement of the verified defect detection rate, and a complement of the verified false positive defect detection rate for each analysis tool in the set;
after calculating the verified performance statistics for the set of analysis tools using the verification data indicating the known and intentionally included faults in the first codebase, analyze a second codebase using one or more analysis tools from the set of analysis tools, the second codebase being distinct from the first codebase;
generate an analysis result for the second codebase for each analysis tool of the one or more analysis tools, the analysis result describing one or more faults and one or more validations identified by the corresponding analysis tool for the second codebase;
compute a probability of defects in a line of code of the second codebase based on the analysis result generated by each of the one or more analysis tools and one or more of the verified detection rate, the verified false positive defect detection rate, the complement of the verified defect detection rate, and the complement of the verified false positive defect detection rate associated with each of the one or more analysis tools;
estimate a risk of defects in the second codebase proportional to the probability of defects in the line of code of the second codebase; and
allocate an amount of resources for performing a quality assurance task on the second codebase based on the risk of defects estimated in the second codebase.

11. The computer program product of claim 10, wherein to calculate the verified performance statistics for the set of analysis tools includes:
analyzing the first codebase with each analysis tool of the set; and
comparing an output of each analysis tool of the set to the verification data indicating the known and intentionally included faults in the first codebase to determine the verified performance statistics of the analysis tool.

12. The computer program product of claim 10, wherein to estimate the risk of defects in the second codebase includes:
determining a total number of lines in the second codebase; and
computing an expected number of defects in the second codebase based on the total number of lines in the second codebase and the probability of defects in the line of code of the second codebase.

13. The computer program product of claim 10, wherein the computer-readable program, when executed on the one or more computing devices, causes the one or more computing devices to:
estimate a risk of hidden defects in the second codebase based on the analysis result generated by each of the one or more analysis tools and one or more of the verified defect detection rate, the verified false positive defect detection rate, the complement of the verified defect detection rate, and the complement of the verified false positive defect detection rate associated with each of the one or more analysis tools, wherein the risk of hidden defects describes one or more lines of the second codebase as having defects that were determined to be defect-free or non-analyzable by the one or more analysis tools.

14. The computer program product of claim 10, wherein the computer-readable program, when executed on the one or more computing devices, causes the one or more computing devices to:
perform the quality assurance task on the second codebase.

15. The computer program product of claim 10, wherein the verified defect detection rate is a rate of detecting actual faults in the first codebase and the verified false positive defect detection rate is a rate of detecting nonexistent faults in the first codebase.

16. The computer program product of claim 10, wherein the quality assurance task includes an optimal resource assignment or a prioritized bug ticketing.

17. The computer program product of claim 10, wherein to estimate the risk of defects in the second codebase further includes:

classifying the one or more faults into actual faults or false faults based on one or more of the verified defect detection rate, the verified false positive defect detection rate, the complement of the verified defect detection rate, and the complement of the verified false positive defect detection rate associated with the one or more analysis tools of the set.

18. The computer program product of claim 17, wherein to classify the one or more faults into actual faults or false faults includes:

computing an aggregate probability of defect in one or more lines of the second codebase based on one or more of the verified defect detection rate, the verified false positive defect detection rate, the complement of the verified defect detection rate, and the complement of the verified false positive defect detection rate associated with the one or more analysis tools of the set;

computing an aggregate probability of no defect in the one or more lines of the second codebase based on one or more of the verified defect detection rate, the verified false positive defect detection rate, the complement of the verified defect detection rate, and the complement of the verified false positive defect detection rate associated with the one or more analysis tools of the set; and comparing the aggregate probability of defect and the aggregate probability of no defect to classify the one or more faults into the actual faults or the false faults.

19. A system comprising:

one or more processors; and one or more memories storing instructions that, when executed by the one or more processors, cause the system to:

store verification data in a first codebase, the verification data indicating known and intentionally included faults in the first codebase;

calculate verified performance statistics for a set of analysis tools using the verification data indicating the known and intentionally included faults in the first codebase, the verified performance statistics including one or more of a verified defect detection rate, a verified false positive defect detection rate, a complement of the verified defect detection rate, and a complement of the verified false positive defect detection rate for each analysis tool in the set;

after calculating the verified performance statistics for the set of analysis tools using the verification data indicating the known and intentionally included faults in the first codebase, analyze a second codebase using one or more analysis tools from the set of analysis tools, the second codebase being distinct from the first codebase;

generate an analysis result for the second codebase for each analysis tool of the one or more analysis tools, the analysis result describing one or more faults and one or more validations identified by the corresponding analysis tool for the second codebase;

compute a probability of defects in a line of code of the second codebase based on the analysis result generated by each of the one or more analysis tools and one or more of the verified defect detection rate, the verified false positive defect detection rate, the complement of the verified defect detection rate, and the complement of the verified false positive defect detection rate associated with each of the one or more analysis tools;

estimate a risk of defects in the second codebase proportional to the probability of defects in the line of code of the second codebase; and allocate an amount of resources for performing a quality assurance task on the second codebase based on the risk of defects estimated in the second codebase.

20. The system of claim 19, wherein to calculate the verified performance statistics for the set of analysis tools includes:

analyzing the first codebase with each analysis tool of the set; and comparing an output of each analysis tool of the set to the verification data indicating the known and intentionally included faults in the first codebase to determine the verified performance statistics of the analysis tool.

21. The system of claim 19, wherein to estimate the risk of defects in the second codebase includes:

determining a total number of lines in the second codebase; and computing an expected number of defects in the second codebase based on the total number of lines in the second codebase and the probability of defects in the line of code of the second codebase.

22. The system of claim 19, wherein the instructions, when executed by the one or more processors, cause the system to:

estimate a risk of hidden defects in the second codebase based on the analysis result generated by each of the one or more analysis tools and one or more of the verified defect detection rate, the verified false positive defect detection rate, the complement of the verified defect detection rate, and the complement of the verified false positive defect detection rate associated with each of the one or more analysis tools, wherein the risk of hidden defects describes one or more lines of the second codebase as having defects that were determined to be defect-free or non-analyzable by the one or more analysis tools.

23. The system of claim 19, wherein the instructions, when executed by the one or more processors, cause the system to:

perform the quality assurance task on the second codebase.

24. The system of claim 19, wherein the verified defect detection rate is a rate of detecting actual faults in the first codebase and the verified false positive defect detection rate is a rate of detecting nonexistent faults in the first codebase.

25. The system of claim 19, wherein the quality assurance task includes an optimal resource assignment or a prioritized bug ticketing.

26. The system of claim 19, wherein to estimate the risk of defects in the second codebase further includes:

classifying the one or more faults into actual faults or false faults based on one or more of the verified defect detection rate, the verified false positive defect detection rate, the complement of the verified defect detection rate, and the complement of the verified false positive defect detection rate associated with the one or more analysis tools of the set.

27. The system of claim 26, wherein to classify the one or more faults into actual faults or false faults includes:

computing an aggregate probability of defect in one or more lines of the second codebase based on one or more of the verified defect detection rate, the verified false positive defect detection rate, the complement of the verified defect detection rate, and the complement of the verified false positive defect detection rate associated with the one or more analysis tools of the set;

computing an aggregate probability of no defect in the one or more lines of the second codebase based on one or more of the verified defect detection rate, the verified false positive defect detection rate, the complement of the verified defect detection rate, and the complement of the verified false positive defect detection rate associated with the one or more analysis tools of the set; and comparing the aggregate probability of defect and the aggregate probability of no defect to classify the one or more faults into the actual faults or the false faults.

\* \* \* \* \*